US008826332B2

(12) United States Patent
Marshall et al.

(10) Patent No.: US 8,826,332 B2
(45) Date of Patent: Sep. 2, 2014

(54) MEDIA DISTRIBUTION AND MANAGEMENT PLATFORM

(71) Applicants: Joshua Marshall, Austin, TX (US); Jen Grogono, Austin, TX (US)

(72) Inventors: Joshua Marshall, Austin, TX (US); Jen Grogono, Austin, TX (US)

(73) Assignee: uStudio, Inc., Austin, TX (US)

( * ) Notice: Subject to any disclaimer, the term of this patent is extended or adjusted under 35 U.S.C. 154(b) by 0 days.

(21) Appl. No.: 13/725,454

(22) Filed: Dec. 21, 2012

(65) Prior Publication Data

US 2014/0181864 A1    Jun. 26, 2014

(51) Int. Cl.
*H04N 7/173* (2011.01)
*H04N 21/6547* (2011.01)

(52) U.S. Cl.
CPC ................................ *H04N 21/6547* (2013.01)
USPC .................. 725/38; 725/87; 725/92; 725/119

(58) Field of Classification Search
CPC .................. H04N 21/234309; H04N 21/2407; H04N 21/252; H04N 21/262; H04N 21/26258; H04N 21/2665; H04N 21/2743; H04N 21/4349; H04N 21/47202; H04N 21/4756; H04N 21/6125; H04N 21/6175; H04N 21/8133; H04N 21/81
USPC ..................................................... 725/41, 87
See application file for complete search history.

(56) References Cited

U.S. PATENT DOCUMENTS

| | | | |
|---|---|---|---|
| 7,245,662 B2 | 7/2007 | Piche | |
| 7,782,937 B2 | 8/2010 | Yun | |
| 7,921,150 B1 | 4/2011 | Schwartz | |
| 8,301,658 B2 | 10/2012 | Chastagnol et al. | |
| 8,311,382 B1 | 11/2012 | Harwell | |
| 8,375,019 B2 | 2/2013 | Salinas | |
| 8,392,591 B2 | 3/2013 | Singh et al. | |
| 8,464,304 B2 | 6/2013 | Harwell et al. | |
| 2005/0177730 A1* | 8/2005 | Davenport et al. | 713/182 |
| 2007/0140255 A1* | 6/2007 | Gautier et al. | 370/395.5 |
| 2007/0157234 A1* | 7/2007 | Walker | 725/38 |
| 2009/0006335 A1 | 1/2009 | Prager | |
| 2009/0019486 A1 | 1/2009 | Kalaboukis | |
| 2009/0037967 A1 | 2/2009 | Barkan et al. | |
| 2009/0094652 A1 | 4/2009 | Al et al. | |
| 2009/0199230 A1 | 8/2009 | Kumar et al. | |
| 2010/0060784 A1 | 3/2010 | Ansari | |

(Continued)

FOREIGN PATENT DOCUMENTS

| | | |
|---|---|---|
| JP | 2006301889 A | 11/2006 |
| JP | 2006319579 A | 11/2006 |
| JP | 2009282734 A | 12/2009 |
| KR | 10-2005-0082340 | 8/2005 |
| KR | 10-2011-0066121 | 6/2011 |

OTHER PUBLICATIONS

"OneLoad", http://www.oneload.com/, 2013 TubeMogul Inc.

(Continued)

*Primary Examiner* — Mark D Featherstone
*Assistant Examiner* — Jen-Shi Huang
(74) *Attorney, Agent, or Firm* — Trop, Pruner & Hu, P.C.

(57) ABSTRACT

An embodiment of the invention simplifies management of the "video lifecycle". An embodiment includes one of more modules that streamline the video publishing process by abstracting technical steps such as video publishing, updating video, unpublishing video, retrieval or statistics concerning video, authorization to process video, validation of video, video metadata processing, video transcoding, and/or video transmission. Other embodiments are described herein.

26 Claims, 11 Drawing Sheets

(56) References Cited

U.S. PATENT DOCUMENTS

| | | | |
|---|---|---|---|
| 2010/0166062 A1 | 7/2010 | Perlman | |
| 2010/0269144 A1* | 10/2010 | Forsman et al. | 725/92 |
| 2011/0276881 A1 | 11/2011 | Keng et al. | |
| 2011/0310995 A1 | 12/2011 | Dougherty, III et al. | |
| 2012/0011442 A1 | 1/2012 | Fay et al. | |
| 2012/0204201 A1 | 8/2012 | Cassidy et al. | |
| 2012/0254925 A1 | 10/2012 | Nassiri | |
| 2012/0323868 A1* | 12/2012 | Robbin et al. | 707/695 |
| 2013/0117418 A1 | 5/2013 | Mutton et al. | |
| 2013/0125014 A1 | 5/2013 | Sharif-ahmadi et al. | |
| 2013/0152131 A1 | 6/2013 | Goldeen et al. | |
| 2013/0227072 A1 | 8/2013 | Youn et al. | |

OTHER PUBLICATIONS

"Magnify", http://www.magnify.net/.

"Hey!spread", http://heyspread.com/.

"Traffic Geyser Review", TrafficGeyserReview.com, http://www.trafficgeyserreview.com/.

"How to Upload Your Video to Multiple Sharing Sites" Larry Kless', Weblog, Sunday, Jun. 21, 2009, http://klessblog.blogspot.com/2009/06/how-to-upload-your-video-tomultiple.

International Searching Authority, "Notification of Transmittal of the International Search Report and the Written Opinion of the International Searching Authority," mailed Apr. 10, 2014, in International application No. PCT/US2013/076769.

* cited by examiner

MEDIA DISTRIBUTION AND MANAGEMENT PLATFORM

BACKGROUND

The success of distribution platforms (e.g., YouTube®, Netflix®, and iTunes®) have made the consumption of video content simpler. However, producing, distributing, and/or managing that content remains a complicated process. Simultaneously, the ubiquity of video requires organizations to incorporate (or strengthen) video strategies in order to capitalize on emerging audiences using social networks, mobile devices, and the like Combined with continuously shifting technical requirements, the process of creating and delivering video successfully requires an investment of people and technology for existing brands and newcomers alike. Managing the video "life cycle" is complex.

BRIEF DESCRIPTION OF THE DRAWINGS

Features and advantages of embodiments of the present invention will become apparent from the appended claims, the following detailed description of one or more example embodiments, and the corresponding figures, in which:

DETAILED DESCRIPTION

Figure 1:
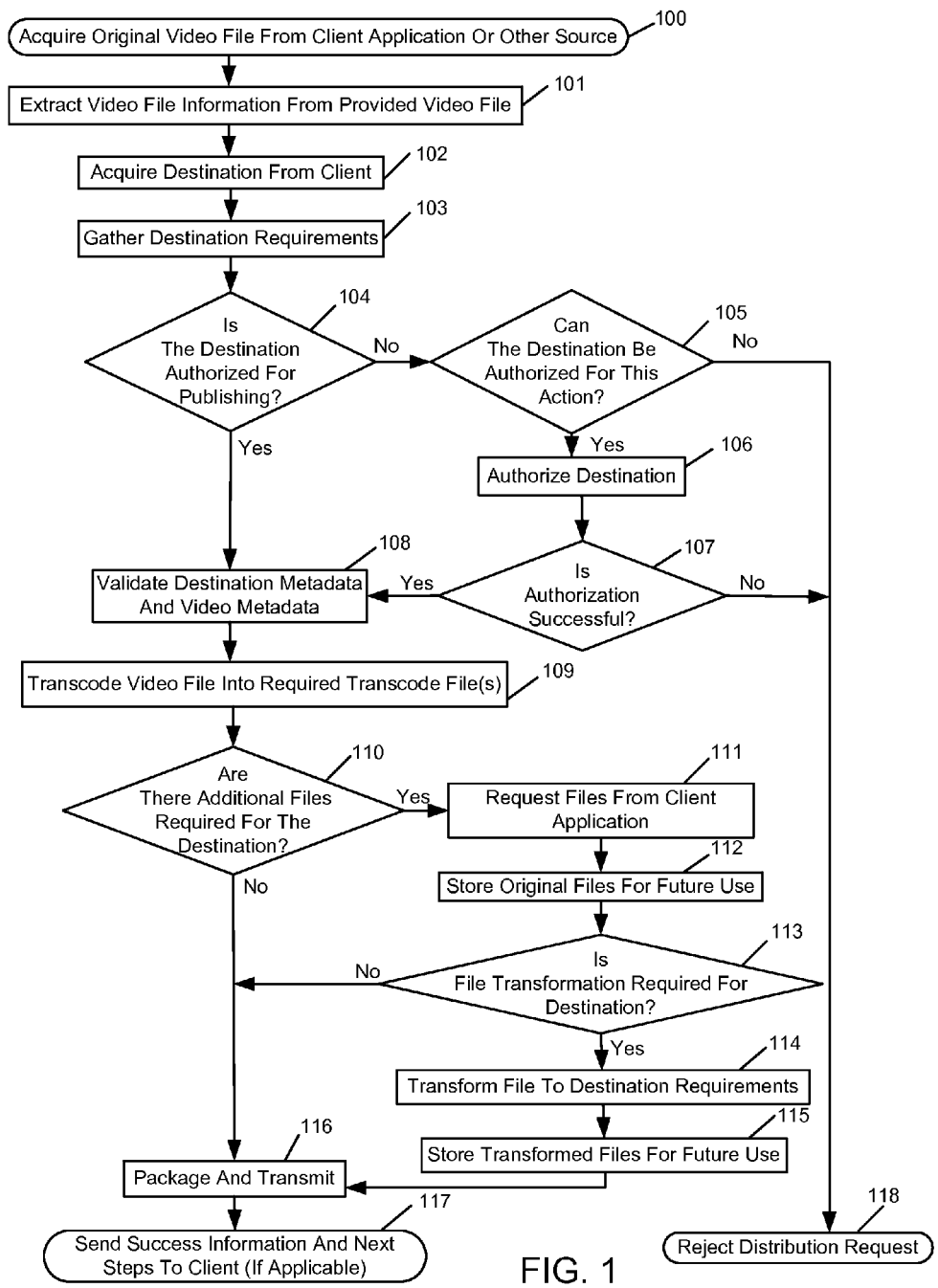
FIG. 1 includes a publishing workflow diagram of an embodiment of the invention.

In the following description, numerous specific details are set forth but embodiments of the invention may be practiced without these specific details. Well-known circuits, structures and techniques have not been shown in detail to avoid obscuring an understanding of this description. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner. "Connected" may indicate elements are in direct physical or electrical contact with each other and "coupled" may indicate elements co-operate or interact with each other, but they may or may not be in direct physical or electrical contact. Also, while similar or same numbers may be used to designate same or similar parts in different figures, doing so does not mean all figures including similar or same numbers constitute a single or same embodiment. At times herein descriptions cover several different figures at once. For clarity, figures include components where the most significant value denotes the figure that includes the component (e.g., element 3XX would be found in FIG. 3 and element 4XX would be found in FIG. 4).

An embodiment of the invention simplifies management of the "video lifecycle" and the like. An embodiment includes one or more modules that streamline the video publishing process by abstracting technical steps such as video publishing, updating video, unpublishing video, retrieval or statistics concerning video, authorization to process video, validation of video, video metadata processing, video transcoding, and/or video transmission.

Video Life Cycle

From the perspective of an embodiment of the invention, the video lifecycle involves at least four processes: publishing, updating, unpublishing, and statistics retrieval. All of these processes occur in tandem with one or more "destinations": distribution platforms that allow some combination of the previous processes. (For instance, some destinations only support publishing and unpublishing and do not report statistics or allow an end user to update the video.) An embodiment allows a user to authorize one or more destinations before beginning one of the processes, once a process has been initiated, or both.

The publish process begins at the moment a "video file" is available. This file may be as simple as an unedited cut from a camera or production, a finished edit that requires approval from a collaborator or client, a final version ready for distribution, or any of the stages in between.

A client application or end user may provide the video file to an embodiment of the invention in a variety of ways: it may be delivered via physical storage medium such as a hard drive, DVD-ROM, or tape format. Alternatively it can be delivered over network via HTTP or other network protocols such as FTP. Finally, if the embodiment has local access to the file, a local file path may be provided.

At this point, in an embodiment a video is packaged according to the individual destination platforms. For each destination the end user selects, an embodiment may determine the appropriate next steps. The video may require transcoding to one or more required formats. The video file may require delivery via a network (e.g., file transfer protocol (FTP), content delivery networks (CDN), application program interface (API), and the like). Finally, the end destination may be populated with the video metadata in the various permutations mandated by the end provider. This process requires close attention to changing API requirements, video support gaps, and network failures.

Once a video is published to one or more destination platforms, both the metadata and the video file itself may be eligible for updates. For instance, if an end user decides to change the title of the video, an embodiment repackages the metadata and resubmits it via the delivery specification. The embodiment may manage a list of updateable resources for each destination platform, which may be variable based on the account type of the end user.

Many destination platforms track statistics about the video and user interaction. For instance, every time a video is played, YouTube® increases a "view" count. Some of these destinations include a method for retrieving these statistics (such as an API or a monthly report). In such cases an embodiment may retrieve those statistics and normalize the values across destinations, so that the end user of an embodiment is able to compare user interaction and determine which destinations are performing well (or poorly). The importance of a particular metric may depend on each user's interpretation of success.

Eventually, a video may require removal from a destination platform (whether due to an error in the content or simply is no longer relevant). An embodiment may support removing (or "unpublishing") a video from any destination that supports it.

A video may require archival. A user may desire that the highest possible video quality is preserved so that any future distribution does not suffer due to prior technological limitations. For instance, the first generation of Apple's® "AppleTV®" product only supported progressive video with a vertical resolution of 720 pixels (known as 720P). However, recent versions of the AppleTV® support resolutions as high as 1080 pixels (known as 1080P). By storing the original video quality, an embodiment ensures that the highest quality can be delivered in the future as well.

System Abstraction

An embodiment abstracts various underlying systems. As referenced with the AppleTV® example, video delivery requirements change frequently. The formats and standards that were dominant five years ago may be less relevant in the future (e.g., FLV, Flash, RTMP), and new distribution formats and platforms emerge frequently (e.g., MPEG DASH, HLS, OTT, and the like). Thus, an embodiment provides both a system of abstracted resources (such as "Video" or "Destination") which enable an end user to easily perform simplified operations (such as "Publish" or "Update") without having knowledge of the underlying system requirements. For instance, an embodiment may choose to hide transcoding a video file (recompressing or repackaging one video into another) as an "implicit" part of publishing or updating a video.

An embodiment amounts to a decoupled interface of resources that simplifies the video lifecycle from a storage layer (which, for example, may leverage technologies like cloud storage, FTP delivery, CDNs, and the like), to a publishing layer (which may abstract all supported platform requirements, APIs, and transcode details into a parallel series of Destinations), to a statistics layer (which may aggregate audience metrics from each platform). This abstraction may surface to either end users via a graphical application or a programmatic interface for client applications by utilizing network technologies such as an HTTP-based REST API.

Publish Workflow

FIG. 1 includes a process workflow for publishing a video to a destination in an embodiment of the invention. In block 100, the end user (or client application of an API) provides a video file to an embodiment. This file may be a high quality master file that must be transcoded for use by destinations. The end user may provide the file over local access to a client application, via network protocols such as an HTTP-based API or FTP, or even digital tape formats.

In block 101, an embodiment determines characteristic(s) for the video. For example, an embodiment extracts and stores information from the uploaded video into a database or other file-based storage system. This information may concern characteristics selected from a group comprising, for example and without limitation, file type (e.g. MPEG-4 Part 14 container), video codec (e.g. H.264/AVC, MPEG 2, and the like), video codec profile (e.g. Main, Baseline, and the like), audio codec (e.g. MP3, PCM, and the like), video duration, video resolution, frame rate, video compression bit rate, audio compression bit rate, and other information as necessary for publishing and other processes.

In block 102, an embodiment may prompt the end user or client application for one or more destinations to be used in publishing. In a client application, this may be one or more graphical user interface workflows in which the user may "click" or otherwise indicate one or more desired destinations. In block 103 the publish requirements for each destination selected may be gathered from databases, configuration files, external APIs, or other locations as appropriate. These requirements may include but are not limited to transcode format(s), metadata requirements, authentication requirements, and the like.

Blocks 104-107 determine whether the selected destination(s) are authorized. If one or more destinations are not authorized, and are able to be authorized, then the authorization process is utilized. Process 104 determines whether the destination is currently authorized, which may include validating credentials against an external API, verifying the results of scheduled authentication tasks by extracting information from a database, or other method as determined by the destination's capabilities. Process 105 parses the results of process 104 and ensures that the end user or client application is capable of authorizing (e.g., the external destination's authentication services are responding, application limits have not been reached, and the like). (See AUTHORIZATION WORKFLOW for more details for process 106.) In block 107 the results of the authorization are verified: if the authorization process is successful, an embodiment may continue to block 108. Otherwise, an embodiment may either fail the request or prompt the end user or client application to attempt authorization again.

Block 108 ensures that the metadata for the video (both gathered in block 101 and gathered from the end user or client application) has been provided and validated. (See VALIDATION WORKFLOW for more details). The metadata requirements required for this step were gathered from block 103. Once the metadata has been validated for each video and destination combination, it is ready to be used for transmission.

Block 109 encapsulates any transcoding required by the end destination. Some destinations support a large variety of input video files (such as YouTube®), while others require specific container formats, video and audio codecs, resolutions, and other aspects of video compression. For example, Hulu® currently requires a MPEG-2 Program Stream file including a 30-50 Mbps MPEG-2 video stream for HD material. If a user or client application provides a video file that does not match one or more destination's transcode requirements, additional transcodes may be generated before progressing on to transmission. (See TRANSCODE WORKFLOW for more details.) After transcoding, the resulting files may be stored for future use as well as transmission.

Once the appropriate transcode(s) have been generated, an embodiment may employ blocks 110-115 to request any additional required files from an end user or client application. Some destinations require supplemental files including but not limited to thumbnail images, alternative language audio streams, or documents. Block 110 inspects the destination requirements gathered in block 103 and determines if any additional files are necessary. Additionally, an embodiment may be able to generate certain required additional files without prompting the user.

If the user or client application must provide the file(s), block 111 involves prompting the user with a graphical interface or the client application with a method for providing the required files. Once an embodiment has access to additional files, it may analyze and store them (block 112) for archival and transformation. Storing the original files serves a similar purpose to storing high-quality video masters: any future transformation benefits from a higher quality source file.

Much like video files, a destination may require additional files be transformed before they can be transmitted (which is determined in block 113). This includes but is not limited to image conversion (PNG to JPEG), audio compression (PCM to MP3), or document conversion (Microsoft® Word® to PDF). If this is required, block 114 should result in one or more transformed files. An embodiment may utilize third-party transformation tools or proprietary software libraries to perform these transformations.

An embodiment may store the transformed files for future use in block 115. An embodiment may utilize local file storage, network storage, or cloud storage partners such as Amazon®, Rackspace®, and the like. These files may be stored with references to the destination and video so that any future publishing or updating operations may use the existing transformed files.

Block 116 identifies the packaging and transmission step. Each destination may provide a unique method of transmitting the file(s) and metadata. Additionally, the metadata for each video may need to be transformed for each destination before it can be transmitted. (See TRANSMIT WORKFLOW for more details.) If a transmission is successful, an embodiment may collect and store any information returned from the destination in block 117. This information may be used for future processes such as updating, statistics retrieval, and unpublishing.

An embodiment may transmit any success information to the end user or client application, and any final steps which may be necessary for publishing to be finalized. For instance, Apple® iTunes® podcasts require a feed submission in the iTunes® client application. An embodiment may provide a feed URL for the end user to submit to the iTunes store as a final step.

Should any part of the publish operation fail (as indicated by blocks 105 and 107), an embodiment may reject the publish operation in block 118 and return failure information to a client application or end user using a similar serialization and transmission strategy as block 117.

Update Workflow

Figure 2:
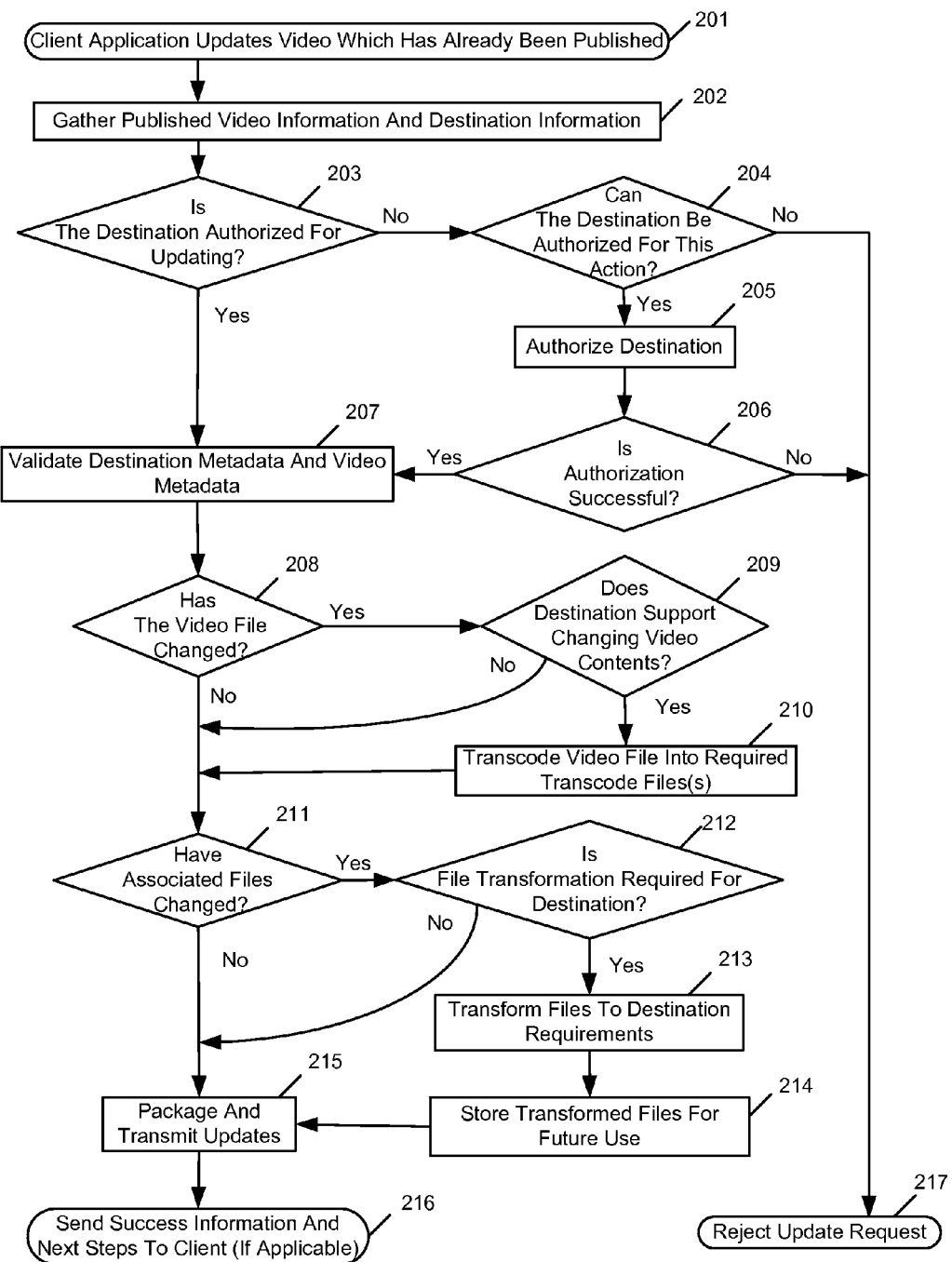
FIG. 2 includes an updating workflow diagram of an embodiment of the invention.

FIG. 2 includes a process for updating a published video on one or more destinations in an embodiment of the invention. In block 201, an end user or client application updates an aspect of the video, including but not limited to replacing the video master file, updating the video metadata, or replacing additional files.

In block 202, like block 103, an embodiment may gather all destination requirements from a database, configuration, and the like. Additionally it may gather published information (such as external destination ids, URLs, and the like) in order to determine the current status of the published video.

If authorization is required to interact with the destination, blocks 203-206 perform a similar authentication workflow as 104-107. Block 203 verifies that authorization is required for the destination by checking the requirements from block 202 and may also communicate with the destination via a network API (if the destination provides one) to check any stored credentials from previous operations. As some destinations may invalidate credentials or disable services, block 204 verifies that the destination can actually be authorized. Block 205 performs the authorization, requesting credentials from the end user or client application as necessary. (See AUTHORIZATION WORKFLOW for more details.) If authorization fails, the update request may be rejected by an embodiment or the user may be prompted for another authorization attempt.

Block 207 performs a similar validation workflow as 108. An embodiment may implement block 207 to ensure that any changes on either the video metadata or the destination requirements do not invalidate the update process. (See VALIDATION WORKFLOW for more details.)

If the video file has changed as determined by block 208 (which can be accomplished by comparing file contents, retrieving previously stored values from a database, and the like), or the transcode requirements for a destination have changed, (re)transcoding may be required. Blocks 209 and 210 identify a workflow for updating the transcode(s) for a destination. Some destinations do not support replacing the video content (like YouTube®), but for those that do block 210 references the same transcoding workflow as block 109. (See TRANSCODE WORKFLOW for more details.)

If the destination requires new additional files, or any previously provided additional files have changed (determined by block 211 in a similar fashion to block 208), blocks 212-214 define a similar file transformation workflow to blocks 113-115. Assuming file transformation is allowed by the destination configuration as determined by block 212, block 213 transforms any original files that were stored by an embodiment after being provided by the end user or client application. Block 214 stores any (re)transformed files for transmission and future usage. If no files were changed and the destination does not require any additional files, an embodiment may use transformed files that were stored during the publish process.

Once the updated metadata is validated, the destination has been authorized, and the files have been prepared according to the destinations configuration, block 215 performs a similar transmission workflow as block 116. (See TRANSMIT WORKFLOW for more details.) One difference may be that the update interface on a destination's API or service endpoint requires a different operation than the publish operation. For instance, if a destination provides an HTTP-based REST API, the initial publish operation may have required a POST request submitted to a resource container, whereas an update operation may require a PUT request submitted to the resource URL returned by the POST request. Additionally, the metadata may require different packaging structure for an update operation than for a publish operation.

If the update process is a success, block 216 identifies that an embodiment may store any updated information in a database or other file-based storage for use in future processes. If there are any additional steps, an embodiment may return that information to the end user or client application.

If the update process failed at any point (as indicated by blocks 204 and 206), an embodiment may reject the update process and return failure information to the end user or client application in block 217.

Unpublish Workflow

Figure 3:
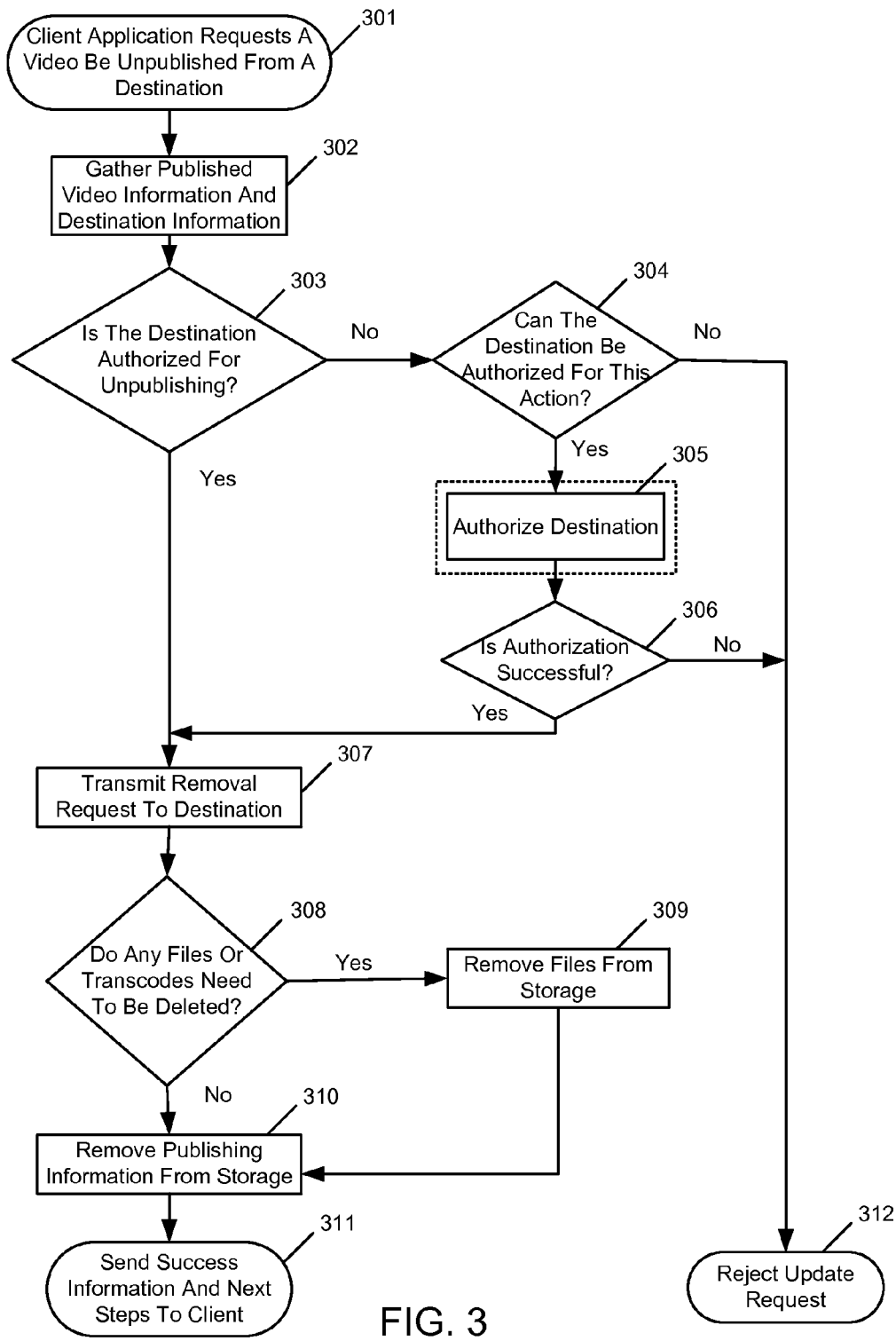
FIG. 3 includes an unpublishing workflow diagram of an embodiment of the invention.
Figure 4:
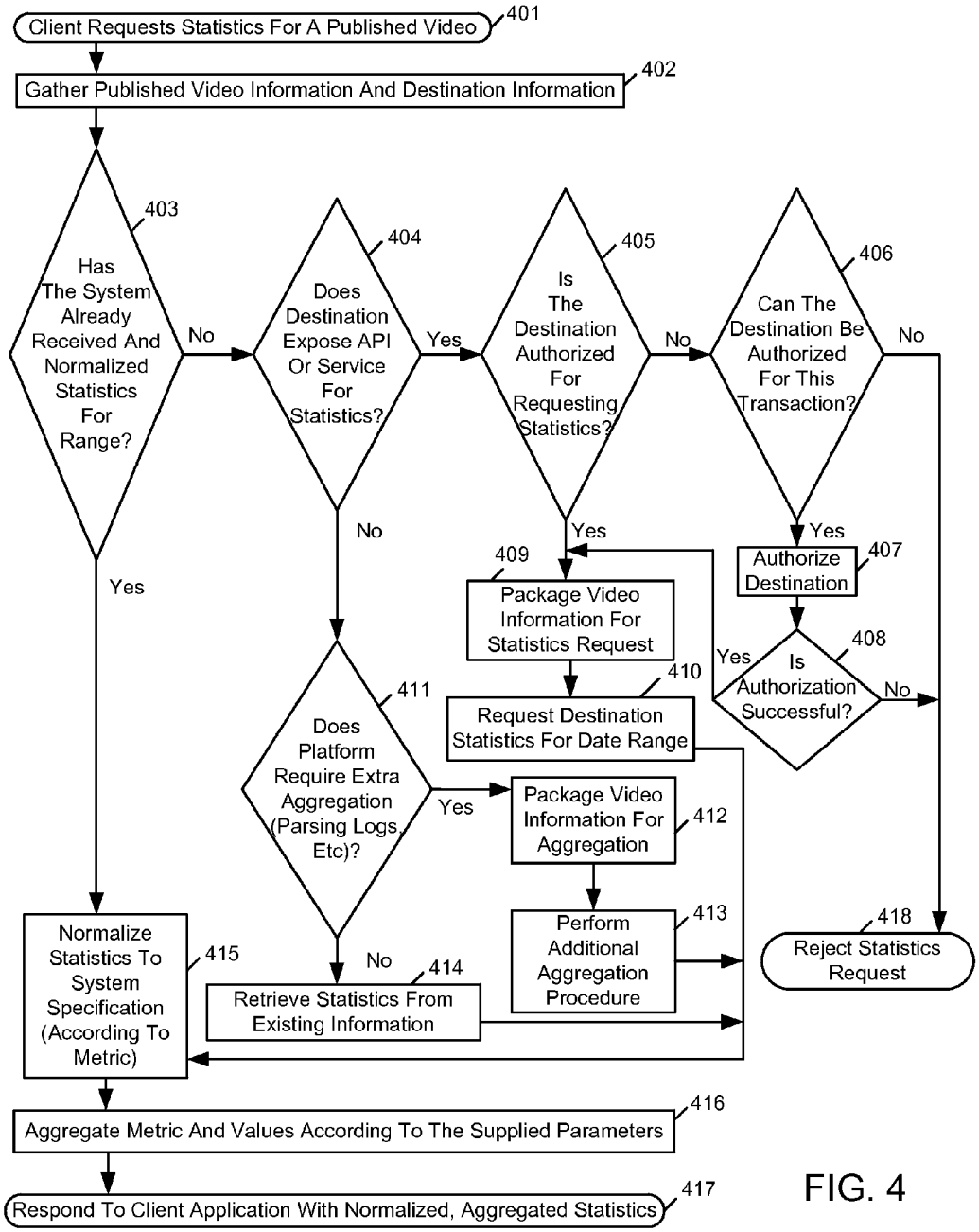
FIG. 4 includes a statistics gathering workflow diagram of an embodiment of the invention.

FIG. 3 includes a method for removing a video from a destination in an embodiment of the invention. In block 301, an end user or a client application requests that a video be removed (or "unpublished") from a destination. Block 302, similar to both 103 and 202, gathers any destination configuration or video metadata from a database, configuration file, and the like that would be required to perform the requested operation.

If a destination requires authorization for unpublishing, blocks 303-306 perform a similar operation as blocks 203-206 and 104-107. (See AUTHORIZATION WORKFLOW for more details.) If authorization is required but fails, an embodiment may reject the removal request or may prompt the end user or client application for an additional authorization attempt.

Block 307 identifies the point at which the destination endpoint or API may be informed of the removal request. Each destination may require one or more methods of notification. For example, if a destination employs an HTTP-based API (like YouTube® or Vimeo®), a DELETE request may be issued to a resource URL. However, if the destination monitors a feed like iTunes® Podcasts, an embodiment may only be required to remove the entry from the feed and the destination will remove the video from the destination the next time it parses the feed. The particular method(s) of transmitting removal information are gathered during block 302.

Since many destinations provide a user interface or API, an embodiment of the invention may choose to passively succeed if the video has already been removed from the destination. For instance, if an end user logs into YouTube® and removes a video, and then issues a remove request to an embodiment, the embodiment may verify that the video still exists on YouTube®. If it does not, the embodiment may proceed to the next phase of removal instead of raising an error due to a "missing" video on the destination.

Blocks 308-310 may be implemented in order to remove any extra resources created throughout publish and update processes. For instance, if an embodiment stored files in blocks 109, 112, 115, 210, or 214, these files may need to be removed from storage. Block 308 involves determining whether these files are shared across videos or destinations (for instance, if two destinations share the same transcode, yet the video has only been removed from one destination, the transcode may not need to be deleted.) Once a file has been confirmed for removal, an embodiment may proceed to block 309 for the actual removal process. Depending on the method of storage, this may involve simply deleting the file from local storage or a series of network operations to remove the file from a cloud storage solution such as Amazon's® S3 or Rackspace's® CloudFiles. Additionally, in block 310, an embodiment may remove any published information from storage such as configuration files or a database as necessary.

If the removal operation was successful, an embodiment may send success information or any additional steps (if necessary) to an end user or client application in block 311. Otherwise, an embodiment may reject the removal operation and send failure information to an end user or client application in block 312.

Statistics Retrieval Workflow

FIG. 400 includes a method for retrieving statistics from a destination in an embodiment of the invention. In block 401, an end user or client application requests statistics for a published video. This request may include a time range, particular statistics (such as "plays" or "impressions"), geographic data, engagement data, or additional metrics as required. Additionally, the request may be initiated by selecting parameters through interface elements in a GUI, providing JSON-serialized parameters over an HTTP-based API, and the like.

Block 402, like 302, 202, and 103, extracts destination configuration and video information from configuration files, databases, and the like. This destination configuration should identify methods of authentication (including but not limited to OAuth, BasicAuth, or pre-shared credentials) as well as the particular metrics supported by the destination. Additionally, any information required to communicate with the destination (such as a video id or resource URLs) may be gathered.

In block 403, an embodiment may search through any existing values that might have been stored to ensure that the values the user requested are not already available. These values may be stored in a file structure, in a memory-based caching solution such as memcached, a relational database such as MySQL, or any other storage method. These values may have been retrieved due to a previous statistics request by an end user or client application, or during an offline, regular process such as a cron job in Unix-style operating systems.

If the values are not already present in the system, an embodiment may choose between two primary methods of obtaining the statistics. If the destination provides an API or service endpoint as determined by block 404 (which an embodiment may indicate in the destination configuration), an embodiment may proceed to authorization. After determining whether the destination is already authorized in block 405 (by utilizing the credentials against an API endpoint, verifying previous validation attributes stored in a database, and the like), authorization proceeds in the same manner in blocks 406-408 as previous operations 304-306, 204-206 and 105-107. (See AUTHORIZATION WORKFLOW for more details.) Once authorized, the desired values may be requested from the destination in blocks 409-410. The particular details of the request vary between destinations: for instance, YouTube® provides an HTTP-based API where a detailed breakdown of video "views" across countries may be requested and aggregated across a particular time range. The results are stored as CSVs packaged in a ZIP archive which may be uncompressed and then parsed. However, other platforms may only provide a total number of views through alternate methods (such as a JSON response to a Javascript-initiated browser request). An embodiment may choose to request the statistics in one or more requests to the destination's endpoint in order to fulfill the client application or end user's request. Block 409 represents serializing the request data in JSON, forming the HTTP request package, and the like while block 410 represents the actual transmission and deserialization of the response from the API (such as parsing return JSON, extracting values from the CSV inside ZIP archive(s), and the like).

If the destination does not expose an API, but instead requires alternative aggregation as determined by inspecting the destination configuration in block 411, an embodiment may implement blocks 412-414. For example, iTunes® does not expose a method for determining how many podcasts have been viewed, but if an embodiment serves the transcodes via a CDN or other network server, there may be log files which can be parsed to determine the number of times a file was downloaded via the iTunes® client.

If the data is not available from previous aggregation the video information may be packaged in such a way that an aggregation process is able to extract the appropriate information (block 412). Once the package has been formed, the appropriate aggregation process is performed in block 413. In the case of iTunes® podcasts for example, one or more transcode URLs may be provided so that the log parsing operation in block 413 is able to determine which network requests constitute a "play". Additionally, the type of request may be analyzed (since many media clients utilize HEAD requests to verify the video is present, but it does not mean a user downloaded or watched the video) as well as other attributes of the request such as number of bytes transferred (which may convey what percentage of the video the user was able to view), the User Agent (to filter out bots or other automated viewers), and the like.

Once the requested values have been extracted from the alternative sources such as log files, an embodiment may choose to store them for future requests as a final part of the aggregation procedure in block 413. Additionally, an embodiment may perform the entire statistics request or aggregation workflow in an offline, scheduled manner to ensure statistics requests for end users or client applications are fast.

If the data is available from previous aggregation (block 414), the values may be extracted from the same storage location utilized by any storage performed in block 413.

In block 415, the statistics may require normalization depending on the values returned from the statistics retrieval process. For instance, one destination may provide "engagement" (the portion of the video that a user viewed) values in timestamps, while another provides the values in percentages. The time-based values may be converted to percentage values utilizing the known duration of the video in order to perform aggregation in the next step.

In block 416, the normalized values may be aggregated according to the provided parameters. In one example, an end user or client application may request a total number of views for each destination across a time range. If Video A received 12 views on Destination B and 48 views of Destination C, and Video D received 10 views on Destination B and no views on Destination C, the values may be summed such that the embodiment returns 22 views for Destination B and 48 views for Destination C. The views may alternatively be aggregated by video, time, and the like.

An embodiment may return the values to the end user or client application in block 417. This could be a visual graphical representation in a GUI application, a JSON-serialized response to an HTTP API, or other method as necessary.

If failure is indicated by any prior processes such as block 206 or 208, an embodiment may reject the entire statistics request and return failure information to a client application or end user in block 418.

Authorization Workflow

Figure 5:
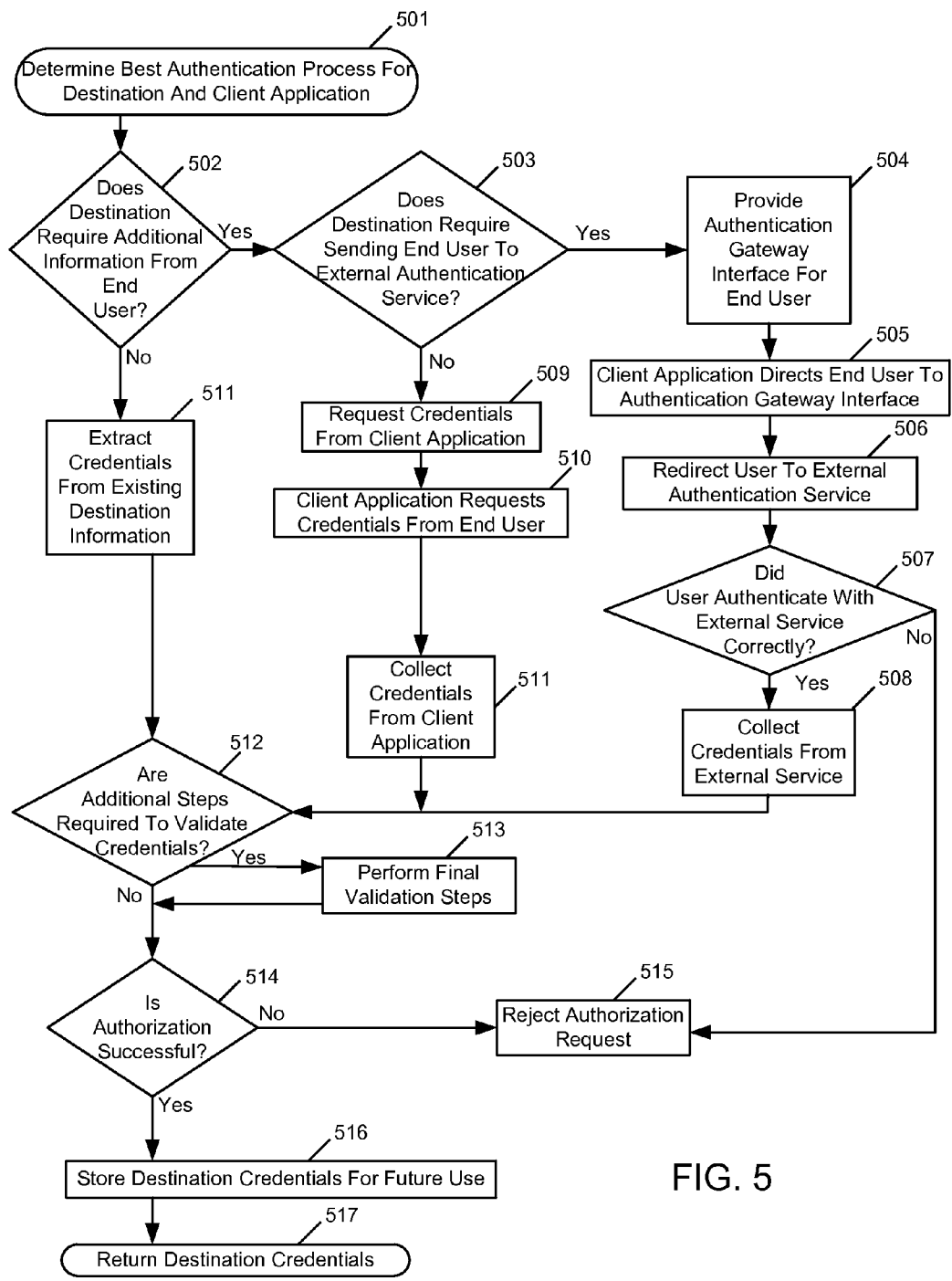
FIG. 5 includes a more detailed authorization workflow diagram of an embodiment of the invention.
Figure 6:
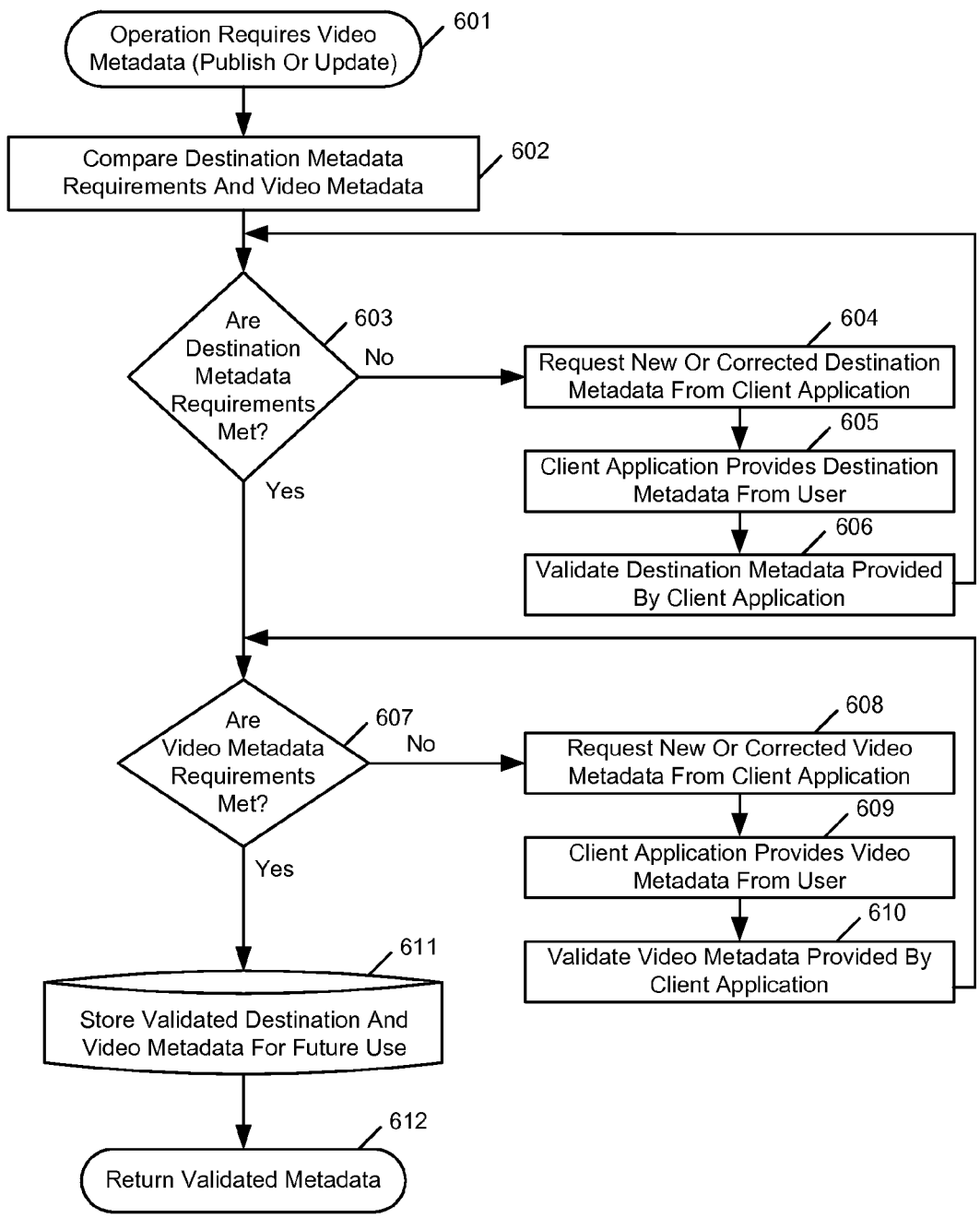
FIG. 6 includes a more detailed metadata validation workflow diagram of an embodiment of the invention.

FIG. 5 details the authorization workflow for an embodiment of the invention. Authorization varies greatly across destinations, although standards may help pattern authentication processes. In block 501, utilizing the destination configuration and existing destination metadata, an embodiment may select the optimum authorization method for an end user or client application. Common HTTP-based authorization methods are OAuth, BasicAuth, and pre-shared credentials. Alternative authorization methods tied to delivery mechanisms (such as FTP or other TCP-based systems) may also be utilized by destinations. Proprietary authentication methods are also common.

Once the appropriate authentication method has been determined, block 502 may require analyzing the provided configuration and destination information to determine whether any additional information is needed from the end user or client application. If so, block 503 identifies whether an end user must visit a separate authentication service before the information can be obtained. This is required in authentication methods such as OAuth, where a user must explicitly allow an application to interact with the destination on his or her behalf. In a standard OAuth implementation, the user must be redirected to a web site provided by the destination, so an embodiment may provide a temporary authentication gateway interface for the user in block 504. This involves serving and directing the end user to a web page over HTTP (block 505) which is capable of redirecting the user to the destination (block 506) using the Location header or alternative redirect method. Additionally, the temporary service may be able to extract success or failure information when the destination redirects the user back to the temporary authentication gateway. If the operation is successful (as determined by block 507 by inspecting the values provided by the destination during the redirect), credentials from the authorization attempt may be extracted and stored for continued use (block 508).

If the destination does not require sending a user to an external authentication service yet still requires additional credentials (such as username and password for a BasicAuth HTTP service or FTP account), an embodiment may request such credentials from a client application or may provide a graphical interface for the end user to populate. For instance, an embodiment may provide one or more graphical interfaces for an end user in block 509 to collect credentials, or an HTTP-based API may be made available to client applications to convey credentials to the embodiment. Block 510 represents an end user actively providing the requested credentials (usually to a graphical interface), and block 511 may involve the client application passing credentials to an embodiment (via API or alternative method) in the case that the graphical interface is being provided by an external client application and not the embodiment itself.

Once credentials have been collected, either from an external service or from a client application/graphical interface, a destination may require additional validation steps. This is determined in block 512 by analyzing the destination configuration or other provided requirements. If additional validation is deemed necessary, this may be performed in block 513. For example, OAuth implementations often require transferring a temporary access code for a permanent token in order to perform operations asynchronously to an end user's interaction with an application. In BasicAuth, extra validation may simply be an authenticated request to ensure that the credentials are valid and the application is authorized to make appropriate calls to the destination.

If the authorization or validation steps are unsuccessful (as determined in block 514 by analyzing the results of the validation steps in 513), the embodiment may reject the authorization request (block 515). This may be an error message in a graphical application, a JSON-serialized response to an HTTP-based API request by a client application, and the like. Alternatively, an embodiment may provide the user another attempt to authorize the destination.

Once authorization is successful, an embodiment may store the credentials for future use (block 516). The credentials may be stored in a local file, a database, and the like An embodiment may encrypt these values before storing for additional security.

As necessary, the authorization workflow may require returning the credentials for use by the outer process (such as publishing, updating, and the like) as identified by block 517.

Validate Metadata Workflow

FIG. 600 details the metadata validation workflow in an embodiment of the invention. Destinations require various permutations of metadata to ensure the video is properly stored and displayed, and an embodiment may require validation of normalized metadata to ensure both ease of user experience and destination approval of the metadata.

Block 601 identifies the initiation of a validation workflow, by any of the previously mentioned processes or other workflows of an embodiment. The metadata to be validated (which may be both destination-specific and video-specific), in addition to any destination configuration and requirements, may be provided for determining the method(s) of validation to be performed.

Block 602 requires comparison of the destination configuration gathered in publish and update operations with the provided video metadata. This video metadata may have been extracted from the video file itself (one method, for example, may be through various container formats that support metadata storage) or may have been provided by an end user through a graphical interface or client application. For example, basic metadata requirements generally include (but are not limited to) a video "title", a "description", a set of "tags" or "keywords", as well as author information. The destination configuration may indicate a required and optional set of metadata fields, identified by a taxonomy internal to the embodiment. Additionally, the destination itself may require metadata. For instance, an embodiment may make an iTunes® podcast available as a destination. A podcast requires a title, a creator, one or more categories, a description, and other fields.

If the destination metadata is not valid or requires additional values (as determined by block 603), an embodiment may respond to the client application with a request for additional credentials or provide a graphical interface for the end user based on the destination configuration (block 604). For instance, if the destination configuration indicates an additional metadata field for an "author", it may also indicate that the value should be a "string". This allows the graphical interface to display the appropriate interface elements for the user to complete.

Once the client has provided the new/updated metadata (block 605) it may be validated according to the destination configuration in block 606. If the provided author is 148 characters long and contains Unicode characters, for instance, and the destination does not allow Unicode and requires less than 127 characters, the embodiment may then prompt the client application or end user with another opportunity to provide valid metadata by returning through blocks 603 and 604.

This process is repeated until all destination metadata is supplied and valid. An embodiment may then perform a similar process with the video metadata (blocks 607-610). For each video being published or updated, the end user may provide all of the required video metadata the destination configuration expects (as requested by the client application in block 608 and provided by the end user in block 609). Additionally, like the destination metadata, each value provided may be validated in block 610 against the destination's configuration to ensure the value will not be rejected once it is transmitted to the destination's endpoint.

An embodiment may restrict all video metadata to a simplified model of normalized metadata to ensure the simplest user experience. This would require that no title in the system can be longer than the shortest allowed title across all destinations, but would also reduce the occurrence of corrections required by validation.

Once all destination and video metadata has been validated, an embodiment may store the values in a local file, database, and the like for future use, as identified by block 611. This simplifies future update processes unless metadata requirements for the destination change or the end user changes the metadata.

An embodiment may then return the validated metadata to the outer process (such as publishing or updating) in block 612 by following a similar serialization and transmission strategy as previous operations.

Transcode Workflow

Figure 7:
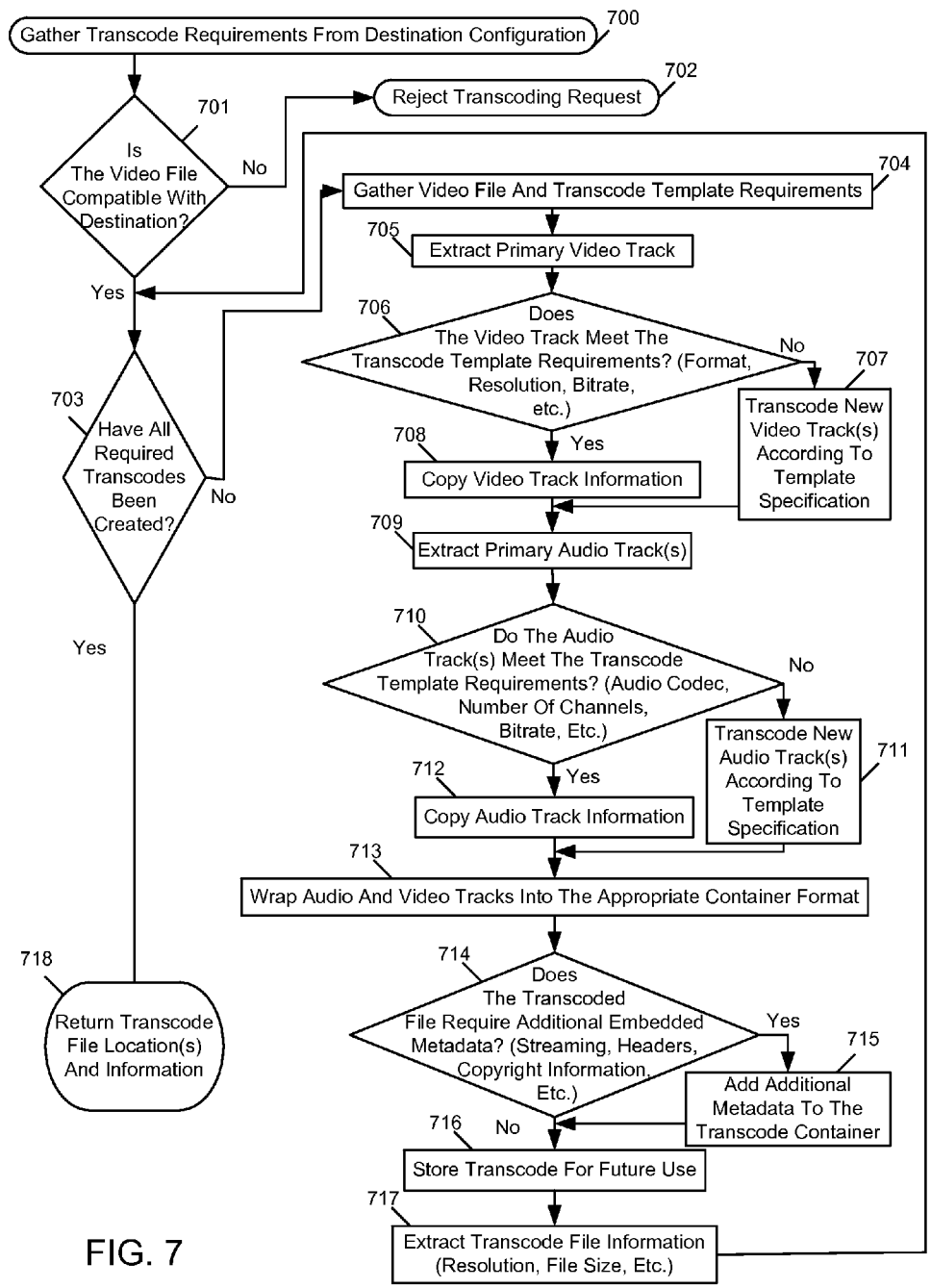
FIG. 7 includes a more detailed transcoding workflow diagram of an embodiment of the invention.

FIG. 7 details the process for transcoding a video in an embodiment of the invention. Transcoding is one of the more technical processes in distribution, and simultaneously a strong candidate for abstraction due to many end users' lack of knowledge about specific video formats and attributes. Subsequently, an embodiment may make transcoding an implicit aspect of the system such that the end user does not need to make decisions about the process.

Block 700 indicates that an embodiment may extract transcode requirements for a destination from a destination's configuration. This configuration should include an array of attribute thresholds that indicate an acceptable transcode, including but not limited to container or encapsulation format, file size, video compression format, video duration, video resolution, frame rate, video compression profile, video compression bit rate, scan type, audio compression format, audio sample rate, audio compression bit rate, audio channels, and the like.

After extracting information about the video file that is being transcoded, an embodiment may ensure the video file is capable of being transcoded in block 701. A video file may not be capable of being transcoded for a variety of reasons: the quality of the file is too low for any of the required transcodes, the video file is missing the necessary audio track(s), the video cannot be read by the transcoding software utilized by the embodiment, there are too many video or audio tracks, and the like. A variety of applications (such as mediainfo or ffmpeg) provide the ability to extract media metadata from a file in order to determine its applicability to particular transcode profile for a destination. If the video file cannot be transcoded, an embodiment may reject the transcoding request (block 702).

For every transcode required by a destination (which may be determined in block 703 by parsing the destination requirements or other provided configuration), an embodiment may process the original video to determine what parameters to provide the transcoding software. Each transcode corresponds to a transcode "template", which identifies particular attributes to which the final transcode must conform. Each of these templates may be compiled in block 704, once again by parsing destination requirements. The primary video track, which may be extracted or streamed from the original media file in block 705, then may be compared in block 706 with the transcode template to determine whether it should be transcoded or not. For instance, if a video file is provided with an H.264 video track, with a resolution of 1920×1080, at a bit rate of 10 Mbps and a progressive frame rate of 30 fps, but a transcode template requires an H.264 video track with a resolution of 1280×720, then the video track must be transcoded to the template's specification. However if the destination has a second transcode template that allows 1920×1080 H.264, then the video track may not be transcoded for the second template. The destination configuration for an embodiment may define bitrate or frame rate thresholds, acceptable ranges for resolution, and the like instead of specific values. In many cases, especially in which a destination depends on a specific hardware environment for playback (such as Apple®'s AppleTV®), a single attribute that does not match the transcode template configuration requires transcoding.

If transcoding for a video track is required, an embodiment may package the new transcode requirements for the specific transcoding software being utilized. Based on the requirements of the transcode template, specific transcoding software may be required as well. Much like destinations, different transcoding applications have various methods of requesting a new transcode. Some expose a network-based API, some are executable binaries with instructions being provided via arguments to the executable, and others utilize shared folders to initiate transcoding based on previously configured transcode profiles. An embodiment may choose to integrate a variety of transcoding solutions in order to process the greatest variety of source files and transcode templates. The result of block 707 should be a video track that conforms to the transcode template specification.

If no transcoding is required, the video track information is copied in block 708. This enables the transcoding of audio and video independently, and the final file will be "remuxed" (individual audio and video tracks combined into a single file) as a last step.

Once a video track is generated, a similar process may be employed for the audio track(s). Based on the transcode template, the audio track is extracted or streamed (block 709) and then analyzed and compared with the transcode template requirements to see if transcoding is necessary (block 710). While the attributes may be quite different (audio sample rate, number of channels, audio compression format, audio compression bitrate, and the like) the process is the same: if the audio track does not match the transcode template requirements, the transcoding instructions may be packaged for the transcoding software being utilized by the embodiment and a new audio track is generated which conforms to the destination's transcode template requirements (block 711). Otherwise, in block 712, the appropriate audio track(s) are copied to be combined with the video track from the previous steps.

In block 713, the video track and audio track are combined into a single file utilizing the encapsulation format indicated by the transcode template. This could be an MPEG-4 Part 14 file, or an MPEG-2 Program Stream, a WebM container file, and the like.

Once the file has been generated, additional steps may be necessary to ensure it can be utilized properly by the destination (as determined by inspecting the destination configuration in block 714). For example, if an MPEG-4 file is intended for HTTP Progressive Streaming (frequently used in feed-based destinations or web players), the video file index information (contained in a "moov" atom) must be moved near the beginning of the file so that the video file can start playing before it has finished downloading. This and other operations may be required in block 715 before the file is considered complete.

Once the transcode has been finalized, it can be stored (block 716). An embodiment may store a transcode for faster update operations in the future. Additionally, some destinations may share transcode templates: if the transcode is stored and the video is published to a destination requiring the same transcode template, the entire transcode workflow might be bypassed and the existing transcode used instead. In addition to the transcode, an embodiment may store the transcode parameters in block 717, as well as any additional metadata like file size that may be used in other environments such as feeds.

After all transcodes have been generated, in block 718 an embodiment may return to the outer process the location of the transcode(s) as well as any transcode parameters or additional metadata.

Transmit Workflow

Figure 8:
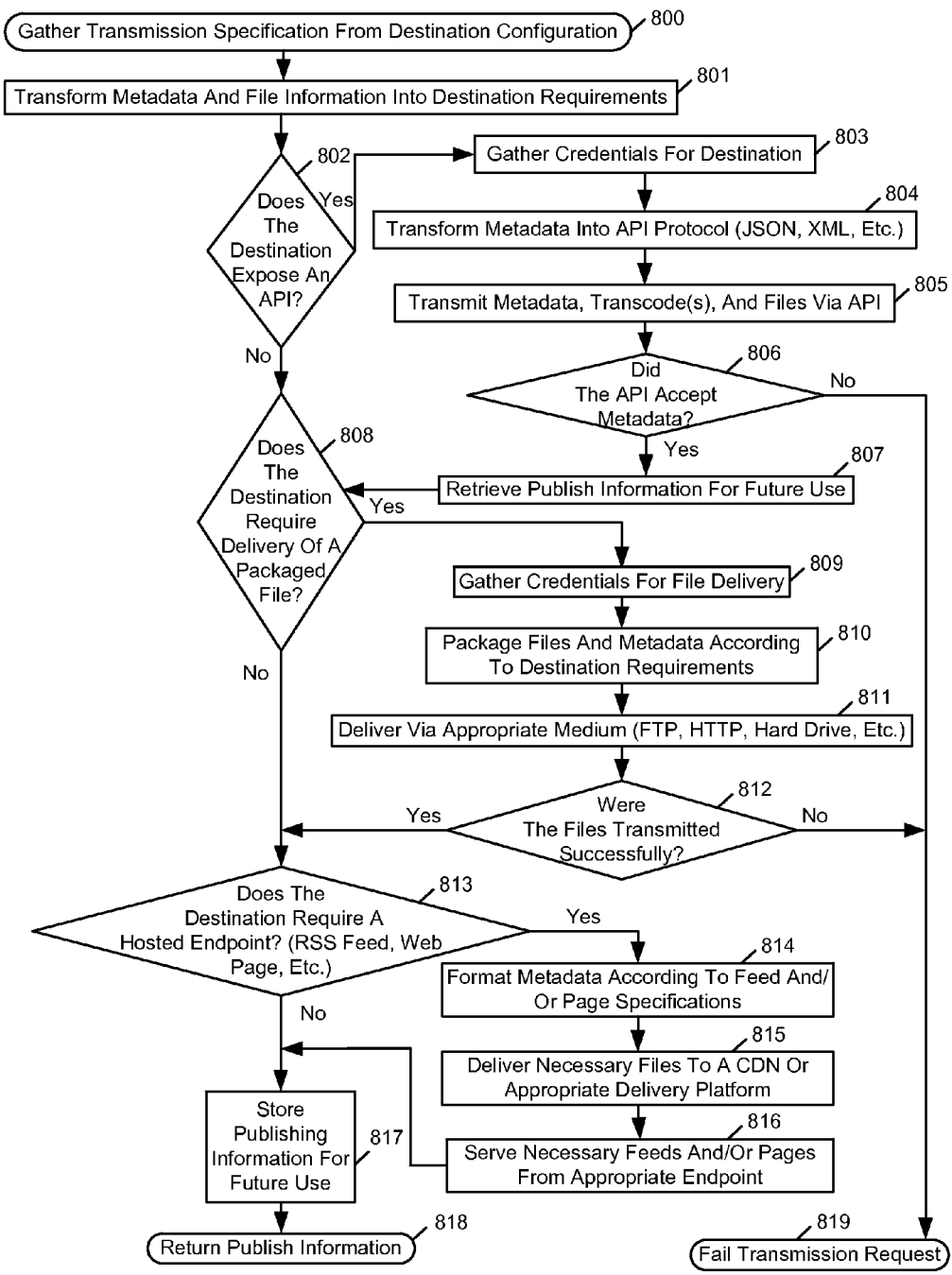
FIG. 8 includes a more detailed transmission workflow diagram of an embodiment of the invention.

FIG. 8 details the destination transmission workflow in an embodiment of an invention. Transmitting a publish request or updating an existing video requires interacting with a variety of protocols and destination requirements, and involves encapsulating specific transmission logic while maintaining the high-level abstraction across resources for end users and client applications.

When metadata and files are ready for transmission to a destination, an embodiment may transform the metadata into destination-specific language in block 801. For example, YouTube®, Blip®, and DailyMotion® each maintain a unique category system. An embodiment may translate a normalized category selection on a video to a specific category supported by that destination, such that a generic category like "Automotive" becomes category number "29" on Blip® and "Autos & Vehicles" on YouTube®.

Each destination may require one or more methods of transmitting the transformed metadata and files. If the destination provides an API (as determined in block 802 by analyzing the destination configuration), the particular operations of the API must be performed in the proper order. For example, submitting a video to an HTTP API may require first exchanging credentials with a session-based token (block 803). This may be a simple POST operation providing the credentials as URL-encoded form values. Once the token has been obtained, each HTTP request must utilize the token in either the headers or as part of the URL. A destination may require a PUT request to upload the bytes of one or more transcoded video files. Once the video file(s) have been uploaded, the destination may return a unique id that represents the video on that destination. Additional POST requests may then be used to update the metadata by serializing the metadata as JSON with values for "title", "description", "tags", and "category". Through this process, both serialization of the metadata being submitted (block 804), and transmission of the serialized and/or raw transcoded video data (block 805), is performed.

Block 806 determines whether a destination's API accepts the metadata that was transmitted. This may involve verifying the status code of an HTTP service (for example, 200 often indicates a successful operation), the response body (in which serialized success/failure information may be communicated), accepting an HTTP callback (through a web service spawned by an embodiment), or other method. If the transmission was successful, the response information may be stored by the embodiment for future update, unpublish, and statistics retrieval operations (block 807).

If the destination requires delivery of a packaged file (determined in block 808), such as a ZIP archive of the transcode(s), thumbnail images, and XML-serialized metadata, then an embodiment may perform a related transmission process. Any credentials required to submit the final packaged content may be gathered in block 809, either from previous authentication steps or by prompting an end user or client application. In our current example, the metadata provided in block 801 may be transformed to generate an XML file which may be compressed with the transcoded videos and any additional files as necessary (block 810). Finally, by utilizing the credentials provided for the destination, the final packaged content may be submitted to the destination (block 811). The file delivery may be over protocols such as FTP, in which case the credentials would be username, password, and FTP host, or HTTP, in which case OAuth or BasicAuth credentials might be utilized. Finally, alternative delivery methods such as physical hard drives may be required, which involves copying the packaged files and any additional manifest files to the destination drive before it is sent to the appropriate destination.

If it can be determined that the packaged files were delivered correctly (block 812), an embodiment may either fail the transmission request or continue processing transmission methods as necessary. For example, if a destination's FTP server reports a failed transmission of a ZIP archive, an embodiment may elect to halt any additional transmission operations and reject the request. Alternatively, if the archive was copied successfully, an embodiment may continue progressing through transmission operations.

If a destination requires a hosted endpoint such as a web site or RSS feed (block 813), an embodiment may implement a web service to host this content. This web service may be implemented in a variety of languages and technologies such as PHP, Ruby, Java, HTML, Javascript, and the like By utilizing these technologies, an embodiment may translate the metadata from the destination-specific language determined in block 801 to the necessary structure of the web service. For example, a standard RSS feed usually implements a <pubDate> element which should display a "published" date and time according to RFC 822. An embodiment may have stored the original publish date and time as a simple timestamp, in which case it may be converted before it can be utilized in the feed. Then, the specific technology selected may format the transformed metadata into the appropriate XML as determined by the "flavor" of RSS required (block 814).

In addition to formatting the metadata, a hosted endpoint may require external services such as CDN or cloud storage (block 815) to ensure continuous delivery and archival of the transcodes that are being delivered. In block 816, the formatted metadata (for example, the final RSS file or a web page) may be transmitted over the appropriate protocol (HTTP, HTTP over SSL, and the like) as determined by the destination. Additional software such as Apache, IIS®, and other HTTP servers may be used in various capacities to transmit the web service components.

Once a destination's API has been notified, the packaged files have been delivered, and/or the hosted endpoints have been configured and are being served, an embodiment may store the published information in order to facilitate future operations such as publish, unpublish, or statistics retrieval (block 817). If the publish operation did not succeed (invalid authentication credentials, invalid metadata, network issues, and the like) then the transmission request may fail in block 819. Otherwise an embodiment may return successful transmission information (such as a unique video id for the destination, a video resource URL, and the like) retrieved from the destination API or other transmission step in block 818.

Distribution Flow

Figure 10:
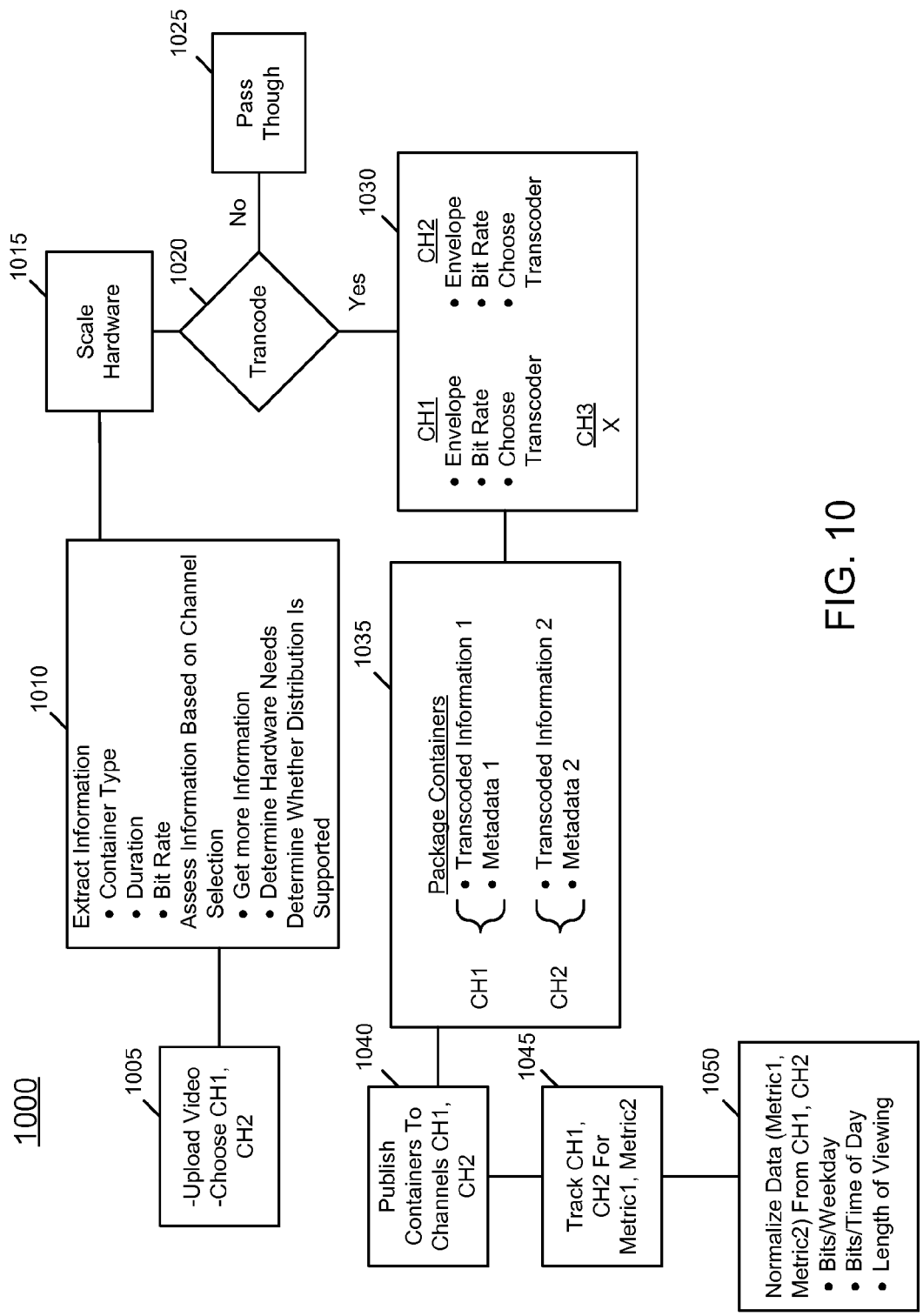
FIG. 10 includes a distribution workflow diagram of an embodiment of the invention.

FIG. 10 includes a method for content distribution in an embodiment of the invention. In process 1000 at least one machine readable medium (e.g., contained in a single physical module of memory, spread across many physical modules of memory in a distributed computing system, and the like) comprises instructions that when executed on a computing device cause the computing device to perform a method as described below.

Figure 9:
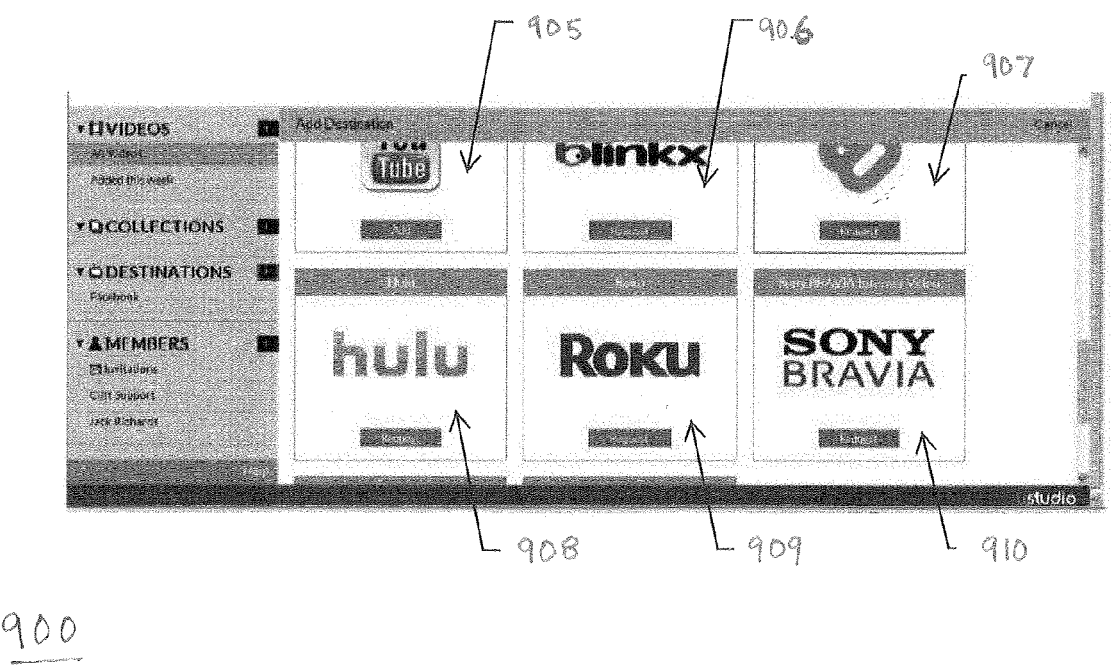
FIG. 9 includes a graphical user interface (GUI) in an embodiment of the invention.

In block 1005 the computing device (e.g., desktop, server, notebook, Ultrabook, laptop, mobile phone, Smartphone, distributed computing cluster, and the like) receives video. An embodiment may display a single instance (i.e., a single page) of a GUI that simultaneously provides a user with options to distribute the video to first, second, and third distribution channels. For example, in FIG. 9 GUI 900 includes portions of graphic elements for six different channels: channel 905 (YouTube®), 906 (Blinkx®), 907 (Boxee®), 908 (Hulu®), 909 (Roku®), 910 (Sony Bravia®). In response to user input supplied via GUI 900 (e.g., a user "clicking" or otherwise selecting distribution channels), an embodiment determines, for example, if the video is to be distributed to the first and second distribution channels 905, 906 but not to third distribution channel 907.

In an embodiment, block 1010 determines first and second characteristics for the video. For example, an embodiment extracts and stores information from the uploaded video. This information may concern first and second characteristics that are selected from a group comprising, for example and without limitation, file type (e.g., MPEG4 (HD), Windows Media (HD), Apple ProRes (SD), and the like), container type, video duration, video resolution, frame rate, video compression bit rate, and audio compression bit rate. The first and second characteristics may be (but not necessarily) determined by analyzing metadata, such as metadata about the file and not necessarily the content of the video. The first and second characteristics may be (but not necessarily) determined by metadata secured in a normalized fashion (API user input) such as video title, keywords, description, and video category. The characteristics may concern a video preimage (e.g., a selected frame of video content from the video).

Block 1010 may include vetting the video based on the extracted/analyzed information to determine if the platform (e.g., see FIG. 11 for a representative example of processor based system for supporting the platform) will support the video. For example, GUI 900 may simultaneously provide the user with options to distribute the video to the first, second, and third distribution channels (905, 906, 907) as well as a fourth distribution channel (908) (e.g., Hulu®). In response to user input supplied via GUI 900, an embodiment may determine the user wishes to distribute the video to the fourth distribution channel. The platform may, however, determine to not transcode the video into transcoded fourth video having a fourth format corresponding to fourth distribution channel 908 in response to analyzing one of the determined characteristics for the video. For example, the file format or compression scheme for the video may be such that the video cannot be transcoded to comply with channel 908.

To remedy any incompatibility, the platform may seek more information from the user to fill a void or issue with a previously selected channel (905, 906). For example, at this point in the process in one embodiment the platform includes a video file, information about the video (e.g., metadata that was uploaded with the file, metadata that was derived from the file after the file was uploaded, and other data that uploaded with the file or was derived therefrom). For example, in response to the user input supplied via GUI 900, the platform may (now that it knows channels 905, 906 are desired but no other channels are desired) determine which first additional channel information is necessary for the first channel 905 and which second channel information is necessary for the second channel 906. The first channel information may be unequal to the second channel information. For example, the first channel information may include one of user credentials (e.g., username, password), a feed title, a file pointer, and a representative frame from the video. Channel 906 may have no need for a file pointer and therefore, if only channel 906 had been selected the platform would not bother the user for such information.

In the present working example (where the user has chosen to distribute video via channels 905, 906) the embodiment may determine that the video is compatible (or has the capacity or potential to be) with the platform. Thus, in block 1020 (block 1015 is discussed further below) the platform determines if transcoding is even needed. For example, the uploaded video may not need transcoding for either of channels 905, 906 and the video may simply be passed through to those channels (block 1025). However, if transcoding is needed then in block 1030 this transcoding occurs. The platform transcodes the video into transcoded first video having a first format corresponding to the first distribution channel (channel 905). The platform also transcodes the video into transcoded second video having a second format corresponding to the second distribution channel (channel 906). The first format (e.g., MPEG-2) may be unequal to the second format (e.g., H.264). The embodiment may, based on incompatibility (for example) or because a user does not desire distribution to the channel, elect to not transcode the video into transcoded third video having a third format corresponding to the third distribution channel (907). This saves effort rather than a brute force transcoding to all possible channel formats.

Transcoding for channels 905, 906 may utilize a "transcode queue". The video may be transcoded from format0 to format1 (which corresponds to channel 905) via an envelope change (e.g., change Windows media file to an envelope with new audio and new video appropriate for YouTube/channel 905). This transcoding may further include adjusting bit rate that is handled via a transcoder (e.g., Rhozet®) that corresponds to a desired channel. Regarding channel 906, video may be transcoded from format0 to format2 (which corresponds to channel 906) via an envelope change from H.264 to FFMPEG or MPEG-2.

After transcoding to channels selected by the user, block 1035 packages first metadata (e.g., keywords for the file, a description of the video, compression rate for the video, duration of playing time for the video) and the transcoded first video into a first container and second metadata and the transcoded second video into a second container; and publishes (block 1040) the first container to the first channel and the second container to the second channel. Publication may vary by channel. For example, for channel 905 the platform may simply supply the file but for channel 906 (or some other channel) the file may be made available via feed, while for channel 907 the platform may simply provide a URL that hosts the file (but may not supply the file directly to the channel).

In block 1045 the method comprises receiving first metric data for the published first container and second metric data for the published second container; wherein the first metric data is formatted differently from the second metric data. This metric data may include statistics such as number of hits/weekday (supplied by channel 905, which does not supply number of hits/hour of day) and number of hits/hour of day (supplied by channel 906, which does not supply number of hits/weekday). Other metric data may include, for example, average duration of play (e.g., does a user watch 10% of the video on average or is the average closer to 90%). Accessing this data may be possible because earlier in the process the platform asked the user (block 1010) for the user's ID (e.g., account credentials) for each of channels 905, 906 to allow the platform to stay "tethered" to the channel even after uploading the video to that channel.

Block 1050 includes normalizing the first and second metric data into common normalized data corresponding to the both the first and second metric data. For example, instead of only showing the user that channel 905 has a number of hits/weekday and channel 906 has number of hits/hour of day, the platform may normalize the data to show the number of hits per day for channel 906 for better comparison with channel 905. With this data the user may decide developing video for one channel (but not the other) makes sense based on the effectiveness of each channel (e.g., why spend time formatting video for channel 906 if viewers seem to prefer channel 905 by a large margin).

Further, because the platform remains tethered to channels 905, 906 the user may easily update or manage the distributed video. For example, using ID information acquired in block 1010 the user may access these channels and update the video (e.g., add 5 minutes of video content to the prior video, updated data related to the video such as keywords for searching), remove the video, and the like.

Focus is now returned to block 1015. In block 1015 the method selects, from a hardware group including first, second, and third processor based systems (e.g., servers, workstations, and the like), the first and second processor based systems but not the third processor based system in response to the user input. For example, the user may have uploaded a single short video file and simply desires to upload the video to channel 905. This may require relatively little computing resources and thus a single processor based system may be marshaled to handle the production. However, in another example the user may be a large enterprise that wishes to upload a sales training video series that includes thirty videos (each file including several megabytes of data) that need to be distributed to eight different channels. This may take far more computer resources. Accordingly, the platform recognizes this load and may select a larger amount of resources to handle the production of the videos. Much of this may occur in parallel so that a user is publishing a video to channel 905 while also publishing the video (or another video) to channel 906. Thus, in an embodiment the method comprises transcoding the video into transcoded first video via a first processor based system in parallel with transcoding the video into the transcoded second video via a second processor based system. The transcoding may occur simultaneously.

Thus, an embodiment includes a single, configurable process for multi-format video and metadata ingest, multi-format encoding and multi-platform publishing with user interface for initiating and tracking process. Embodiments solve the problem of videos and metadata not rendering properly on websites, iptv systems, mobile devices, and the like, causing video owners to spend time and money to handle each file separately through manual steps. Further, since the formatting is done in the cloud in an embodiment, there are significant advantages in time savings and parallel machine processing, dramatically reducing the hardware and software investments that video owners must make to format videos and metadata.

An embodiment provides a platform that handles operations such as (1) collaboration, (2) organization and packaging, (3) publication and distribution, and/or (4) tethered measurement and analysis.

Regarding (1) collaboration, creating video may be a collaborative effort. Video assets may be spread across organizations. An embodiment of the platform provides a shared space for a team to work together and track activities (e.g., video editing, audio files, meta-data, and graphics). The platform allows for normalizing the processes and maintaining the assets in one spot. The platform also allows for coordination and normalization for the ingest of various formats and codec schemes, from multiple creators and vendors, directly into what appears to the user as a "virtual studio". The user simply uploads through its browser, FTP, and the like. Video content may be complex with lots of moving parts. An embodiment applies real-time, intelligent validation on video ingest to ensure all the right parts of the video are intact and to prevent less than ideal assets from entering a video library of the platform. A user may share videos with a select group of creators, partners and/or co-workers. The user may do so privately via email links, an embeddable player on the user's own site, or via a "private screening room" (hosted by the platform). While hosted in the private screening space the user may iterate through rough cuts with colleagues, customers or partners. The user may manage access and permissions so the user can get the approval it needs before the video is released.

Regarding (2) organization and packaging, once the video is created, an embodiment of the platform creates an organized home for the user's files (e.g., a single place where the files are available and accessible to the user's team/partners).

Video metadata is very diverse and an embodiment of the platform simplifies metadata chaos by capturing and mapping accurate information and images for each destination (i.e., channel). Managing and optimizing the metadata for video discovery across multiple destinations/channels is time consuming and complicated but the platform allows the user to efficiently manage, update and test in one place. An embodiment allows the user to organizing video into persistent buckets (i.e., "collections").

Regarding (3) publication and distribution, publishing and distributing videos requires more than just a feed. Managing work-flow within a single video player can be challenging enough, but adding multiple videos, multiple destinations, and many different formats and metadata requirements into the mix, adds more complexity. An embodiment helps offload the tasks and complexities from publishing and distribution processes—online and offline.

An embodiment delivers high quality videos to many destination points, fast. The embodiment may auto-connect to many open destinations, and the ability to deliver to other distribution partners where there is no pre-existing relationship.

Transcoding video for optimal performance on many destinations may necessitate constant changes in encoding software and codec requirements. An embodiment, via the cloud, delivers video on demand. Quality, speed and redundancy are success factors for the embodiment. An embodiment operates with a CDN to ensure videos are delivered quickly.

An embodiment delivers video to various mobile devices, web browsers or social media sites. The embodiment provides an intelligent player that adapts to the end-point, dynamically moving between (for example) HTML5, Flash or QuickTime. The player can be customized to match the user's brand, web-site design, ad network or even CDN.

Regarding (4) tethered measurement and analysis, measuring the success of just one video on just one destination can be burdensome. Add multiple videos and multiple destinations with differing statistics and the burden increases. An embodiment aggregates video statistics (metrics) across multiple destinations/channels. The embodiment lessens this burden of metric tracking by collecting and aggregating content performance statistics for videos across published destinations. Doing so allows the user to understand how its video investments are performing, including conversions from video load-to-play, and most viewed or shared video, as well as the preferred length of time. An easy-to-use reporting interface allows the user optimize views and export the results. A user can compare the performance of a destination or a collection of videos to better map a business strategy.

Figure 11:
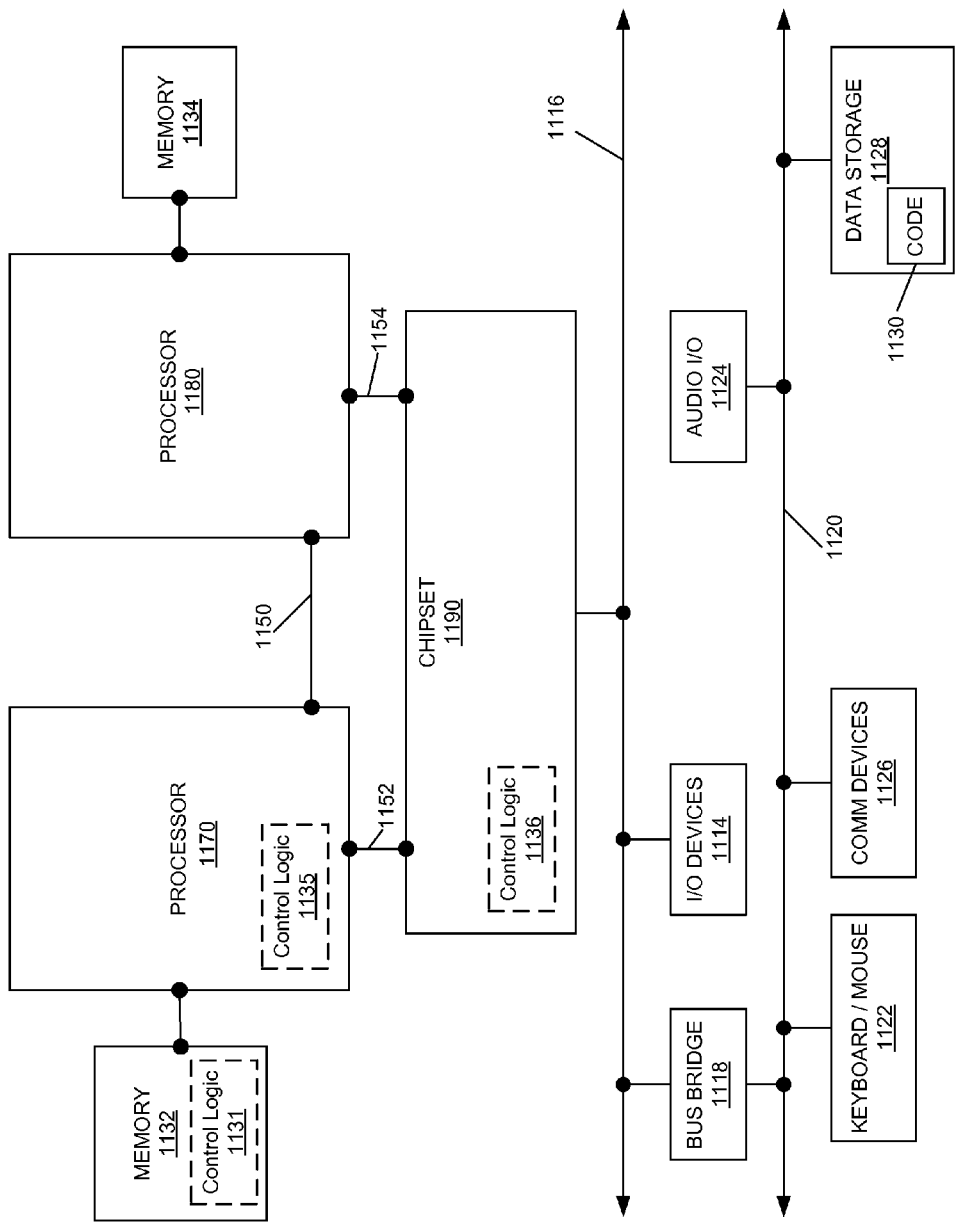
FIG. 11 includes a system for implementing embodiments of the invention.

Embodiments may be implemented in many different system types. Referring now to FIG. 11, shown is a block diagram of a system (e.g., server, desktop, distributed cluster, tablet, notebook, mobile computing device, Smartphone, personal digital assistant) in accordance with an embodiment of the invention. Multiprocessor system 1100 is a point-to-point interconnect system, and includes a first processor 1170 and a second processor 1180 coupled via a point-to-point interconnect 1150. Each of processors 1170 and 1180 may be multicore processors. The term "processor" may refer to any device or portion of a device that processes electronic data from registers and/or memory to transform that electronic data into other electronic data that may be stored in registers and/or memory. First processor 1170 may include a memory controller hub (MCH) and point-to-point (P-P) interfaces. Similarly, second processor 1180 may include a MCH and P-P interfaces. The MCHs may couple the processors to respective memories, namely memory 1132 and memory 1134, which may be portions of main memory (e.g., a dynamic random access memory (DRAM)) locally attached to the respective processors. First processor 1170 and second processor 1180 may be coupled to a chipset 1190 via P-P interconnects, respectively. Chipset 1190 may include P-P interfaces. Furthermore, chipset 1190 may be coupled to a first bus 1116 via an interface. Various input/output (I/O) devices 1114 may be coupled to first bus 1116, along with a bus bridge 1118, which couples first bus 1116 to a second bus 1120. Various devices may be coupled to second bus 1120 including, for example, a keyboard/mouse 1122, communication devices 1126, and data storage unit 1128 such as a disk drive or other mass storage device, which may include code 1130, in one embodiment. Code may be included in one or more memories including memory 1128, 1132, 1134, memory coupled to system 1100 via a network, and the like. Further, an audio I/O 1124 may be coupled to second bus 1120.

Embodiments may be implemented in code and may be stored on storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Embodiments of the invention may be described herein with reference to data such as instructions, functions, procedures, data structures, application programs, configuration settings, code, and the like. When the data is accessed by a machine, the machine may respond by performing tasks, defining abstract data types, establishing low-level hardware contexts, and/or performing other operations, as described in greater detail herein. The data may be stored in volatile and/or non-volatile data storage. The terms "code" or "program" cover a broad range of components and constructs, including applications, drivers, processes, routines, methods, modules, and subprograms and may refer to any collection of instructions which, when executed by a processing system, performs a desired operation or operations. In addition, alternative embodiments may include processes that use fewer than all of the disclosed operations, processes that use additional operations, processes that use the same operations in a different sequence, and processes in which the individual operations disclosed herein are combined, subdivided, or otherwise altered. In one embodiment, use of the term control logic includes hardware, such as transistors, registers, or other hardware, such as programmable logic devices (1135). However, in another embodiment, logic also includes software or code (1131). Such logic may be integrated with hardware, such as firmware or micro-code (1136). A processor or controller may include control logic intended to represent any of a wide variety of control logic known in the art and, as such, may well be implemented as a microprocessor, a micro-controller, a field-programmable gate array (FPGA), application specific integrated circuit (ASIC), programmable logic device (PLD) and the like.

A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While embodiments of the invention have been described with respect to a limited number of embodiments, those skilled in the art will appreciate numerous modifications and variations therefrom. It is intended that the appended claims cover all such modifications and variations as fall within the true spirit and scope of embodiments of the invention.

What is claimed is:

1. At least one non-transitory machine readable medium comprising instructions that when executed on a computing device cause the computing device to perform a method comprising:

coupling the computing device to a first medium that includes at least one of a physical storage medium and a network;

after coupling the computing device to the first medium, receiving a video file, which includes video, from at least one of an application program interface (API), a client application, and an end user via the first medium;

storing the video file in at least one memory which is coupled to at least one processor of the computing device and is further coupled to at least one display;

displaying a single instance of a graphical user interface (GUI), via the at least one display, that simultaneously provides a user with options to distribute the video to first, second, and third distribution channels;

in response to user input supplied via the single instance of the GUI, determining the video is to be distributed to the first and second distribution channels but not to the third distribution channel;

determining first and second characteristics for the video, the first and second characteristics selected from a group comprising file type, container type, video duration, video resolution, frame rate, video compression/decompression (codec) format, video codec profile, video compression bit rate, audio codec format, and audio compression bit rate;

in response to the user input, extracting at least one characteristic for each of the first and second distribution channels from one or more configuration files, the at least one characteristic selected from a group comprising file type, container type, video duration, video resolution, frame rate, and video compression bit rate;

in response to the user input, determining metadata requirements for the first and second distribution channels;

in response to the user input and to receiving user credentials for the first and second distribution channels, determining the user is authorized to distribute content to the first and second distribution channels;

in response to the user input, determining the first and second characteristics for the video, extracting at least one characteristic for each of the first and second distribution channels, determining metadata requirements for the first and second distribution channels, and determining the user is authorized to distribute content to the first and second distribution channels: (a) transcoding the video into transcoded first video having a first format corresponding to the first distribution channel; (b) transcoding the video into transcoded second video having a second format corresponding to the second distribution channel, the first format unequal to the second format; (c) not transcoding the video into transcoded third video having a third format corresponding to the third distribution channel; (d) packaging first metadata and the transcoded first video into a first container having a first container format and second metadata and the transcoded second video into a second container having a second container format different from the first container format, the first container format including at least one of XML, a HTTP-compatible protocol, and JSON; and (e) publishing the first container to the first channel and the second container to the second channel via at least one of a content delivery network (CDN), a network file server, and an API;

wherein the first metadata includes at least one of a title for the video, file size for the video, a tag for content of the video, a description for the content of the video, publication date for the video, keywords for the video, compression rate for the video, and duration of playing time for the video.

2. The at least one medium of claim 1, the method comprising:

respectively communicating first and second requests, to at least one of the first and second channels and a log file, for first metric data for the published first container and second metric data for the published second container;

in response to requesting the first and second metric data, obtaining the first metric data for the published first container and the second metric data for the published second container and storing the first and second metric data in the at least one memory;

wherein the first metric data is formatted differently from the second metric data; the first metric data having a first metric data format and the second metric data having a second metric data format;

wherein the first request is formatted differently from the second request;

wherein the first and second metric data each include a statistic comprising at least one of view count, impressions, geographic data, and engagement data.

3. The at least one medium of claim 2, the method comprising normalizing the first and second metric data into common normalized data corresponding to the both the first and second metric data; wherein the normalizing includes reformatting the second metric data to comply with the first metric data format.

4. The at least one medium of claim 1, the method comprising;

estimating computing resources needed to transcode the video into the first and second transcoded videos;

selecting, from a hardware group including first, second, and third processor based systems, the first and second processor based systems, but not the third processor based system, to transcode the video into the first and second transcoded videos in response to the user input and estimating the computing resources.

5. The at least one medium of claim 1, the method comprising:

displaying the single instance of the GUI that simultaneously provides the user with options to distribute the video to the first, second, and third distribution channels as well as a fourth distribution channel;

in response to user input determining the video is to be distributed to the fourth distribution channel; and determining to not attempt to transcode the video into transcoded fourth video having a fourth format corresponding to the fourth distribution channel in response to analyzing one of the determined first and second characteristics and consequently determining the video is not capable of being transcoded into the fourth format.

6. The at least one medium of claim 1, the method comprising:

receiving, from the user, first account credentials corresponding to the first channel and second account credentials corresponding to the second channel; and accessing the first channel via the first account credentials and the second channel via the second account credentials;

publishing the first container to the first channel and the second container to the second channel in response to accessing the first and second channels.

7. The at least one medium of claim 6, the method comprising:

receiving first metric data for the published first container and second metric data for the published second container in response to receiving the first and second account credentials and without having to prompt the user for either of the first and second account credentials after the receiving the first and second account credentials;

wherein the first metric data is formatted differently from the second metric data.

8. The at least one medium of claim 1, the method comprising:

in response to the user input determining which first channel information is necessary for the first channel and which second channel information is necessary for the second channel;

after determining which first channel information is necessary for the first channel and which second channel information is necessary for the second channel; request the first and second channel information from the user;

wherein the first channel information is unequal to the second channel information;

wherein the first channel information includes one of a feed title, a file pointer, and a representative frame from the video.

9. The at least one medium of claim 1, wherein the first format includes a first bit rate and the second format includes a second bit rate unequal to the first bit rate.

10. The at least one medium of claim 1, wherein in response to determining metadata requirements for the first and second distribution channels, the method comprises:

receiving metadata information, specific to the first distribution channel, from the user;

unsuccessfully validating the metadata information; and in response to unsuccessfully validating the metadata information, prompting the user for additional metadata information specific to the first distribution channel.

11. The at least one medium of claim 1, wherein determining the user is authorized to distribute content to the first distribution channel comprises, in response to the user input, (a) determining to use a first authentication method to determine the user is authorized to distribute content to the first distribution channel, the first authentication method corresponding to the first distribution channel but not the second distribution channel; and (b) prompting the user for additional authentication credentials that are specific to first authentication method and the first distribution channel;

wherein determining the user is authorized to distribute content to the second distribution channel comprises, in response to the user input, (a) determining to use a second authentication method, unequal to the first authentication method, to determine the user is authorized to distribute content to the second distribution channel, the second authentication method corresponding to the second distribution channel but not the first distribution channel.

12. The at least one medium of claim 1, the method comprising:

receiving audio that corresponds to the video;

determining an audio characteristic for the audio;

in response to the user input, extracting an audio characteristic for the first distribution channel;

in response to the user input, determining the audio characteristic for the audio, and extracting the audio characteristic for the first distribution channel: determining the audio does not need to be transcoded; and packaging the audio into the first container.

13. The at least one medium of claim 1, the method comprising:

in response to the user input, determining a first transmission protocol for the first channel and a second transmission protocol for the second channel, the first transmission protocol being unequal to the second transmission protocol;

in response to determining the first and second transmission protocols, publishing the first container via the first transmission protocol and the second container via the second transmission protocol.

14. An apparatus comprising:
at least one processor, coupled to at least one memory and a display, to perform operations comprising:
receiving a video file, which includes video, from at least one of an application program interface (API), a client application, and an end user;
storing the video file in the at least one memory;
displaying a single instance of a graphical user interface (GUI), via the display, that simultaneously provides a user with options to distribute the video to first, second, and third distribution channels;
in response to user input supplied via the single instance of the GUI, determining the video is to be distributed to the first and second distribution channels but not to the third distribution channel;
determining first and second characteristics for the video, the first and second characteristics selected from a group comprising file type, container type, video duration, video resolution, frame rate, video compression/decompression (codec) format, video codec profile, video compression bit rate, audio codec format, and audio compression bit rate;
in response to the user input, extracting at least one characteristic for each of the first and second distribution channels from one or more configuration files, the at least one characteristic selected from a group comprising file type, container type, video duration, video resolution, frame rate, and video compression bit rate;
in response to the user input, determining metadata requirements for the first and second distribution channels;
in response to the user input and to receiving user credentials for the first and second distribution channels, determining the user is authorized to distribute content to the first and second distribution channels;
in response to the user input, determining the first and second characteristics for the video, extracting at least one characteristic for each of the first and second distribution channels, determining metadata requirements for the first and second distribution channels, and determining the user is authorized to distribute content to the first and second distribution channels: (a) transcoding the video into transcoded first video having a first format corresponding to the first distribution channel; (b) transcoding the video into transcoded second video having a second format corresponding to the second distribution channel, the first format unequal to the second format; (c) not transcoding the video into transcoded third video having a third format corresponding to the third distribution channel; (d) packaging first metadata and the transcoded first video into a first container having a first container format and second metadata and the transcoded second video into a second container having a second container format different from the first container format, the first container format including at least one of XML, a HTTP-compatible protocol, and JSON; and (e) publishing the first container to the first channel and the second container to the second channel via at least one of a content delivery network (CDN), a network file server, and an API;
wherein the first metadata includes at least one of a title for the video, file size for the video, a tag for content of the video, a description for the content of the video, publication date for the video, keywords for the video, compression rate for the video, and duration of playing time for the video.

15. The apparatus of claim 14, the operations comprising:
respectively communicating first and second requests, to at least one of the first and second channels and a log file, for first metric data for the published first container and second metric data for the published second container;
in response to requesting the first and second metric data, obtaining the first metric data for the published first container and the second metric data for the published second container and storing the first and second metric data in the at least one memory;
wherein the first metric data is formatted differently from the second metric data; the first metric data having a first metric data format and the second metric data having a second metric data format;
wherein the first request is formatted differently from the second request;
wherein the first and second metric data each include a statistic comprising at least one of view count, impressions, geographic data, and engagement data.

16. The apparatus of claim 15, the operations comprising normalizing the first and second metric data into common normalized data corresponding to the both the first and second metric data; wherein the normalizing includes reformatting the second metric data to comply with the first metric data format.

17. The apparatus of claim 14, the operations comprising;
estimating computing resources needed to transcode the video into the first and second transcoded videos; and
selecting, from a hardware group including first, second, and third processor based systems, the first and second processor based systems, but not the third processor based system, to transcode the video into the first and second transcoded videos in response to the user input and estimating the computing resources.

18. The apparatus of claim 14, the operations comprising:
displaying the single instance of the GUI that simultaneously provides the user with options to distribute the video to the first, second, and third distribution channels as well as a fourth distribution channel;
in response to user input determining the video is to be distributed to the fourth distribution channel; and
determining to not attempt to transcode the video into transcoded fourth video having a fourth format corresponding to the fourth distribution channel in response to analyzing one of the determined first and second characteristics and consequently determining the video is not capable of being transcoded into the fourth format.

19. The apparatus of claim 14, the operations comprising:
receiving, from the user, first account credentials corresponding to the first channel and second account credentials corresponding to the second channel; and
accessing the first channel via the first account credentials and the second channel via the second account credentials;
publishing the first container to the first channel and the second container to the second channel in response to accessing the first and second channels.

20. The apparatus of claim 19, the operations comprising:
receiving first metric data for the published first container and second metric data for the published second container in response to receiving the first and second account credentials and without having to prompt the user for either of the first and second account credentials after the receiving the first and second account credentials;

wherein the first metric data is formatted differently from the second metric data.

21. The apparatus of claim 14, the operations comprising:

in response to the user input determining which first channel information is necessary for the first channel and which second channel information is necessary for the second channel;

after determining which first channel information is necessary for the first channel and which second channel information is necessary for the second channel; request the first and second channel information from the user;

wherein the first channel information is unequal to the second channel information;

wherein the first channel information includes one of a feed title, a file pointer, and a representative frame from the video.

22. The apparatus of claim 14, wherein the first format includes a first bit rate and the second format includes a second bit rate unequal to the first bit rate.

23. The apparatus of claim 14, wherein in response to determining metadata requirements for the first and second distribution channels, the operations comprise:

receiving metadata information, specific to the first distribution channel, from the user;

unsuccessfully validating the metadata information; and in response to unsuccessfully validating the metadata information, prompting the user for additional metadata information specific to the first distribution channel.

24. The apparatus of claim 14, wherein determining the user is authorized to distribute content to the first distribution channel comprises, in response to the user input, (a) determining to use a first authentication method to determine the user is authorized to distribute content to the first distribution channel, the first authentication method corresponding to the first distribution channel but not the second distribution channel; and (b) prompting the user for additional authentication credentials that are specific to first authentication method and the first distribution channel;

wherein determining the user is authorized to distribute content to the second distribution channel comprises, in response to the user input, (a) determining to use a second authentication method, unequal to the first authentication method, to determine the user is authorized to distribute content to the second distribution channel, the second authentication method corresponding to the second distribution channel but not the first distribution channel.

25. The apparatus of claim 14, the operations comprising:

receiving audio that corresponds to the video;

determining an audio characteristic for the audio;

in response to the user input, extracting an audio characteristic for the first distribution channel;

in response to the user input, determining the audio characteristic for the audio, and extracting the audio characteristic for the first distribution channel: determining the audio does not need to be transcoded; and packaging the audio into the first container.

26. The apparatus of claim 14, the operations comprising:

in response to the user input, determining a first transmission protocol for the first channel and a second transmission protocol for the second channel, the first transmission protocol being unequal to the second transmission protocol;

in response to determining the first and second transmission protocols, publishing the first container via the first transmission protocol and the second container via the second transmission protocol.

\* \* \* \* \*